United States Patent [19]
Fujiwara

[11] Patent Number: 5,923,438
[45] Date of Patent: *Jul. 13, 1999

[54] DATA PROCESSING APPARATUS HAVING A DRAWER AND IMAGE READING HEADS OR PRINTING HEADS

[75] Inventor: Tatsuo Fujiwara, Kawasaki, Japan

[73] Assignee: Fujitsu Limited, Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/576,092

[22] Filed: Dec. 21, 1995

[30] Foreign Application Priority Data

Apr. 14, 1995 [JP] Japan .................................. 7-089156

[51] Int. Cl.⁶ .................................................. B65H 83/00
[52] U.S. Cl. .......................... 358/401; 358/296; 358/501; 347/152
[58] Field of Search .................................... 399/113, 364, 399/374, 1, 107, 110, 111, 114, 124, 361; 358/296, 498, 300, 400, 401, 501, 468; 347/108, 222, 138, 245, 139, 262, 152, 263, 264, 170, 215, 218, 221; 346/145; 355/23, 24, 77

[56] References Cited

U.S. PATENT DOCUMENTS

D. 323,354  1/1992  Nava ........................................ D19/78
4,708,462  11/1987 Stemmle .................................. 399/374
5,166,812  11/1992 Dow .
5,270,841  12/1993 Watanabe ................................ 358/296
5,273,272  12/1993 Nakamura et al. ..................... 271/167
5,539,538   7/1996 Terao ...................................... 358/498
5,662,320   9/1997 Fujiwara et al. ....................... 271/3.14
5,755,435   5/1998 Fujiwara ................................. 271/4.04

FOREIGN PATENT DOCUMENTS 0 621 719  10/1994  European Pat. Off. .
6-509826   4/1994  Japan .

Primary Examiner—Peter S. Wong
Assistant Examiner—Derek J. Jardieu
Attorney, Agent, or Firm—Armstrong, Westerman, Hattori, McLeland & Naughton

[57] ABSTRACT

A data processing apparatus is provided which includes at casing having upper and lower cavities arranged in a vertically spaced relationship. A drawer is arranged in the upper cavity and has a hopper for accommodating sheets. The lower cavity functions as a stacker. Sheets are conveyed from the hopper to the lower cavity along a sheet conveying path. An upper image reading or printing head is arranged in the drawer to act on the upper surface of the sheet. A lower image reading or printing head is arranged in the drawer or at a position along the sheet conveying path to act on the lower surface of the sheet. Therefore, it is possible to read information on both surfaces of the sheet or to print data onto both surfaces of the sheet.

12 Claims, 35 Drawing Sheets

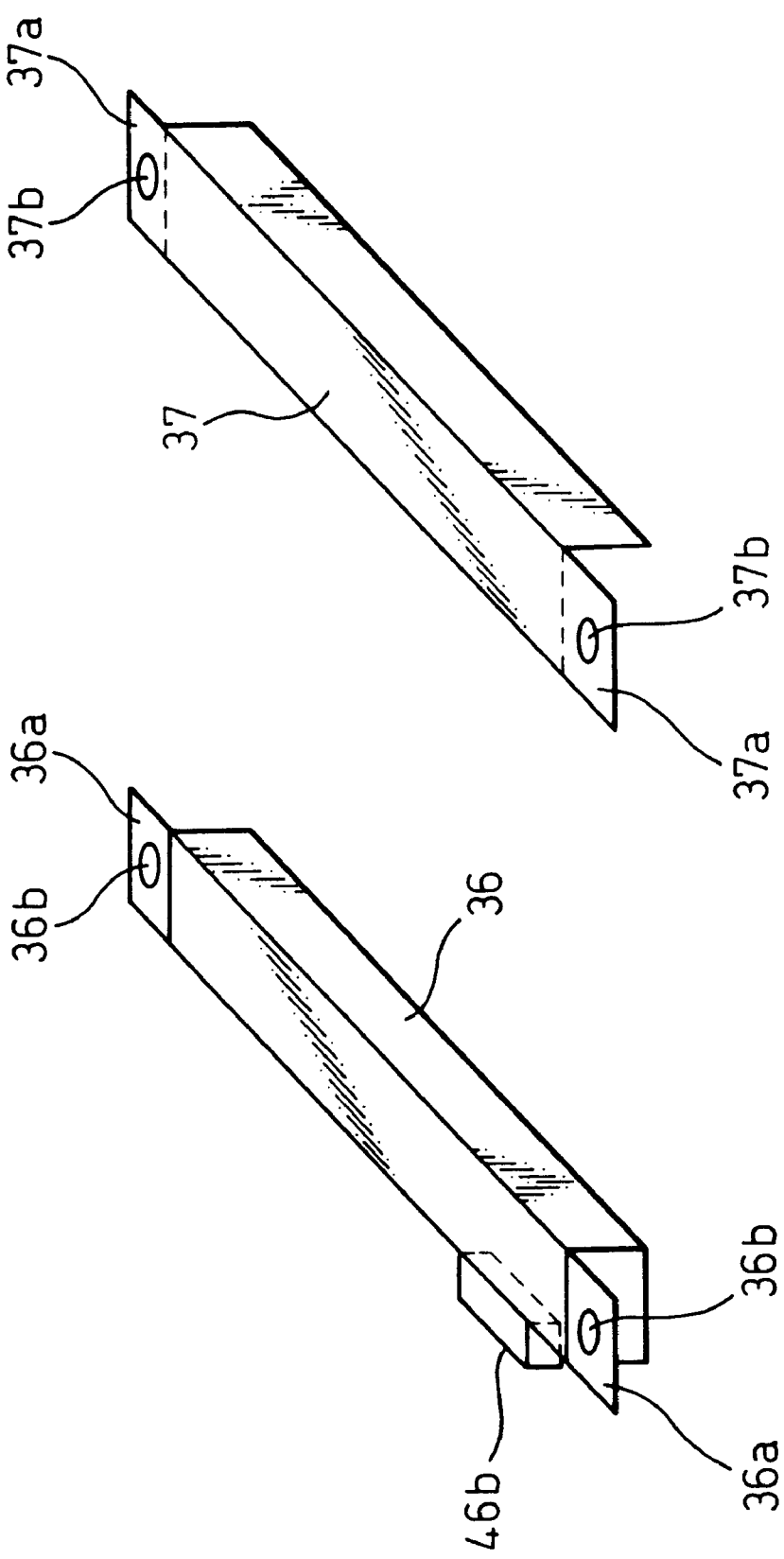

DATA PROCESSING APPARATUS HAVING A DRAWER AND IMAGE READING HEADS OR PRINTING HEADS

BACKGROUND OF THE INVENTION

1. Field of the Invention

The present invention relates to a data processing apparatus such as an image reading apparatus or a printer.

2. Description of the Related Art

A data processing apparatus used as an image reading apparatus or a printer includes an image reading head for reading data formed on a document or a printing head for printing data onto a printing sheet. The data processing apparatus also includes sheet conveying rollers for conveying a sheet from a hopper to a stacker. For example, one type of image reading apparatus having an auto-document feeder (ADF) is shown in FIG. 50 in the attached drawings. In FIG. 50, the image reading apparatus 190 comprises a hopper 191, an image reading head 192, a stacker 193, and a feeder 194 including sheet conveying rollers. Documents are automatically fed from the hopper 191, through the image reading unit 192, to the stacker 193, by the feeder 194. This type of image reading apparatus 190 can efficiently process data since a plurality of documents can be automatically fed.

Another type of image reading apparatus having a flat bed is shown in FIG. 51 in the attached drawings. The image reading apparatus 200 comprises an image reading window (flat bed) 201 and an image reading unit 202 arranged inside the flat bed 201. In this apparatus, a document is manually set on the flat bed 201 and an image reading operation is carried out sheet by sheet. This type of image reading apparatus is not efficient when a plurality of documents are to be processed because only one document can be set on the flat bed 201. However, this type of image reading apparatus is simple in construction and inexpensive, as compared with the ADF-type image reading apparatus, so that the flat bed-type image reading apparatus is sometimes preferably used, in particular, for personal individual use, when it is not necessary to handle many documents.

These image reading apparatuses suffer from a problem in that the image reading apparatus requires a larger space around it. For example, in the ADF-type image reading apparatus, the stacker 193 projects laterally from the casing of the image reading apparatus and the hopper 191 projects upwardly from the casing of the image reading apparatus. Therefore, a larger area is needed for placement of the image reading apparatus. Also, it is not possible to place any article on the image reading apparatus because of the provision of the upwardly projecting hopper 191 so that the space above the image reading apparatus cannot be utilized.

In the flat bed-type image reading apparatus, there is no stacker or hopper projecting outwardly from the casing of the image reading apparatus, and the image reading apparatus is relatively compact. However, a document must be set on the flat bed 201, and the space above the image reading apparatus cannot be utilized.

In Japanese Patent Application No. 6-509826, the inventor of the present invention has proposed an image reading apparatus by which a space around the image reading apparatus can be effectively used. FIGS. 52 and 53 show this type of image reading apparatus. This image reading apparatus 210 comprises a box-shaped casing having upper and lower cavities, and a drawer 211 arranged in the upper cavity. A hopper 215 and an image reading head 212 are arranged in the drawer 211, and the lower cavity serves as a stacker 214. A U-shaped sheet conveying path 213 is provided to convey documents from the hopper 215 through the image reading head 212 to the stacker 214.

The top wall of the casing of the image reading apparatus is solid and no functional element is arranged in the top wall of the casing. Therefore, it is possible to place an article such as a personal computer on the casing of the image reading apparatus, and the image reading apparatus can be used in a restricted area, so that the space around the image reading apparatus is available for use. The present invention is intended to further improve this type of image reading apparatus.

Recently, there have been increasing demands for an image reading apparatus which can read not only data on the upper surface of the document, i.e., but also data on the lower surface of the document.

In addition, a printer can be formed, using the constructional features of the above described apparatus 210, by positioning a printing head in place of the image reading head 212 in the drawer 211. In this case too, the space utility around the printer is high, and it is further desired that the printer can print data not only on the upper surface of a printing sheet, i.e., but also on the other surface of the printing sheet.

Further, one user may wish to process (read or print) data on both surfaces of a sheet, but another user may wish to process data on only one surface of a sheet. If the data processing apparatus is completely designed in such a manner that it can process data on both surfaces of a sheet, a user who wishes the data processing capability on only one surface of a sheet may think that the data processing apparatus includes an extra function. On the other hand, if the data processing apparatus is designed in such a manner that it can process data on only one surface of a sheet, a user who wishes the data processing capability on both surfaces may think that data processing apparatus is well enough equipped. Therefore, it is desirable that an extra function can be optionally provided to the data processing apparatus.

Also, it is not desirable that the data processing apparatus becomes large in size even if the data processing apparatus can process data on both surfaces of a sheet, so that the space around the apparatus can be used.

SUMMARY OF THE INVENTION

The object of the present invention is to provide a data processing apparatus which can process data on both surfaces of a sheet.

Another object of the present invention is to provide a data processing apparatus which can process data on both surfaces of a sheet without the need to increase the space around the data processing apparatus.

A further object of the present invention is to provide a data processing apparatus which can process data on both surfaces of a sheet without the need to increase the size of the data processing apparatus.

A further object of the present invention is to provide a data processing apparatus which includes a first processing head to process data on one surface of a sheet and a second processing head to process data on the other surface of a sheet, the second processing head being optionally provided.

According to the present invention, there is provided a data processing apparatus which includes: a casing having a first cavity and a second cavity arranged in a vertically spaced relationship; a drawer arranged any one of the first and second cavities, the drawer being movable between a pulled-out position and a pushed-in position and having a hopper for accommodating sheets stacked thereon, each of the sheets having a first surface and a second surface; sheet conveying facilities for conveying sheets along a sheet conveying path formed in the apparatus from the hopper when the drawer is in the pushed-in position to the other cavity; first data processing facilities arranged in the drawer to act on the first surface of the sheet; and second data processing facilities arranged in the apparatus to act on the second surface of the sheet.

Preferably, the first and second data processing facilities may be image reading heads or printing heads. The first cavity is preferably arranged above the second cavity.

With this arrangement, the first data processing facilities is arranged in the drawer to act on the first surface of the sheet, and the second data processing means is arranged in the apparatus to act on the second surface of the sheet. Therefore, it is possible to process data on both surfaces of the sheet stacked in the hopper arranged in the drawer. The top wall of the casing of the image reading apparatus is solid and no functional element is arranged in the top wall of the casing, so it is possible to place an article such as a personal computer on the casing of the image reading apparatus. The second data processing facilities can be arranged within the casing of the data processing apparatus without any need to increase the size of the casing as compared with an apparatus which includes first data processing facilities only.

Preferably, the second data processing facilities is arranged in the drawer. The second data processing facilities is detachably arranged in the drawer.

Alternatively, the sheet conveying path includes a curved portion between the first and second cavities, and the second data processing facilities is arranged within the casing at a position along the curved portion of the sheet conveying path. Preferably, the curved portion of the sheet conveying path includes a cover attached to the apparatus and having a concave surface, and a guide member positioned inside the cover and having a convex surface, the second data processing facilities being incorporated in the guide member. Preferably, the guide member having the second data processing facilities incorporated therein is detachably attached to the casing of the data processing apparatus, and wherein a further guide member having no data processing facilities and having an outer profile generally identical to that of the first guide member can be attached to the casing of the data processing apparatus when the first guide member is detached from the casing of the data processing apparatus.

Preferably, the second data processing facilities is detachably arranged in the apparatus, and in this case, first and second printed wiring boards are provided. The first printed wiring board is adapted for operating the first data processing facilities when the first data processing facilities only is used in the apparatus, and the second printed wiring board is adapted for operating the second data processing facilities, the first printed wiring board having a first connector, the second printed wiring board having a second connector coupled to the first connector when the second data processing facilities with the second data processing means is used in the apparatus and the second printed wiring board is inserted in the apparatus.

Alternatively, the first printed wiring board is adapted for operating the first data processing facilities when the first data processing means only is used in the apparatus, and the second printed wiring board is adapted for operating the first data processing facilities and the second data processing facilities, the second printed wiring board being replaceable with the first printed wiring board when the second data processing facilities is used with the first data processing facilities in the apparatus.

According to a further aspect of the present invention, there is provided a data processing apparatus which includes: a casing having a first cavity and a second cavity arranged in a vertically spaced relationship; a drawer arranged in one of the first and second cavities, the drawer being movable between a pulled-out position and a pushed-in position and having a hopper for accommodating sheets stacked thereon; sheet conveying facilities for conveying sheets in the apparatus along a sheet conveying path from the hopper when the drawer is in the pushed-in position to the other cavity; first data processing facilities arranged in the drawer to act on the sheet; and second data processing facilities detachably arranged in the apparatus to act on the sheet.

According to a further aspect of the present invention, there is provided a data processing apparatus which includes: a casing having a first cavity and a second cavity arranged in a vertically spaced relationship; a drawer arranged in one of the first and second cavities, the drawer being movable between a pull-out position and a pushed-in position and having a hopper for accommodating sheets stacked thereon, each of the sheets having a first surface and a second surface; sheet conveying facilities for conveying sheets in the apparatus along a sheet conveying path from the hopper when the drawer is in the pushed-in position to the other cavity, the sheet conveying path including a curved portion between the first and second cavities; the curved portion of the sheet conveying path including a cover attached to the data processing apparatus and having a concave surface, and guide facilities positioned inside the cover and having a convex surface; first data processing facilities arranged in the drawer to act on the first surface of the sheet; second data processing facilities arranged in the apparatus to act on the second surface of the sheet; the guide facilities comprising one of a first guide member having the second data processing facilities incorporated therein, an outer profile, and attaching facilities, and a second guide member having no data processing facilities, an outer profile generally identical to the outer profile of the first guide member, and attaching facilities formed identically to the attaching facilities of the first guide member; and attaching facilities coupled for engagement with the attaching facilities of the attaching facilities of one of the first and second guide members to selectively attach one of the first and second guide members to the data processing apparatus.

Preferably, the second guide member has an auxiliary guide means at a position corresponding to a position of the second data processing facilities in the first guide member. Preferably, the auxiliary guide facilities includes a roller or a plate which is elastically forced towards a roller of the sheet conveying means.

BRIEF DESCRIPTION OF THE DRAWINGS

The present invention will become more apparent from the following description of the preferred embodiments, with reference to the accompanying drawings, in which:

FIG. I is a diagrammatic cross-sectional view of a data processing apparatus according to the first embodiment of the present invention;

FIG. 9 is a perspective view of the lower data processing head;

FIG. 10 is a perspective view of the lower dummy head equipped to the date processing apparatus in place of the lower data processing head of FIG. 9;

DESCRIPTION OF THE PREFERRED EMBODIMENTS

Figure 1:
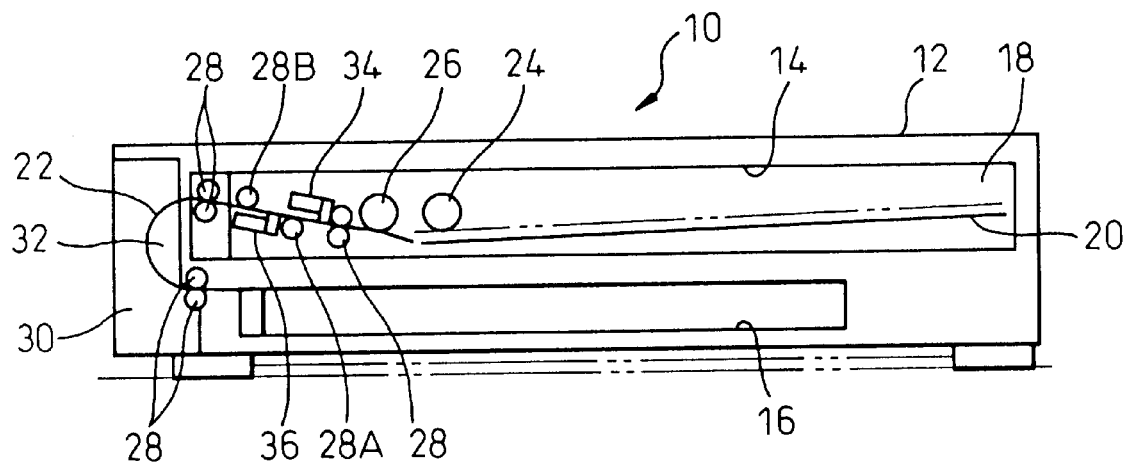
Figure 2:
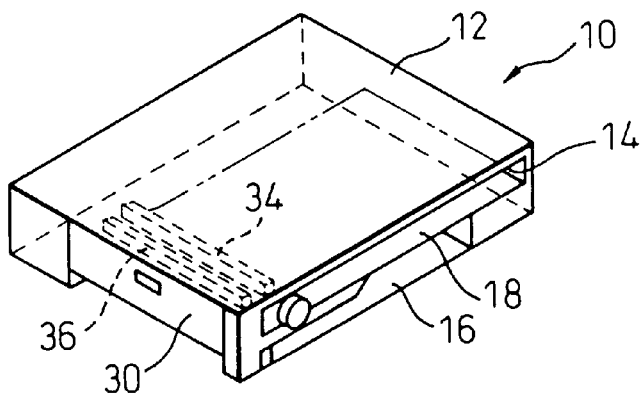
FIG. 2 is a diagrammatic perspective view of the apparatus of FIG. 1 in a reduced scale.
Figure 3:
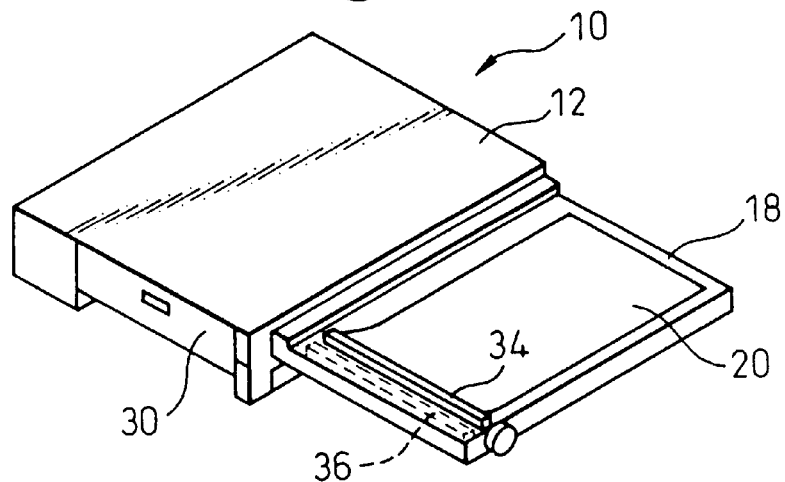
FIG. 3 is a perspective view of the apparatus of FIG. 2 when the drawer is in the pull-out position.

FIGS. 1 to 3 show a data processing apparatus according to the first embodiment of the present invention. The data processing apparatus 10 includes casing 12 having a first cavity 14 and a second cavity 16 arranged horizontally and parallel to each other in a vertically spaced relationship. The first cavity 14 is arranged above the second cavity 16, and the latter serves as a stacker for receiving a discharged sheet. It is possible to insert a movable stacker in the second cavity 16.

A drawer 18 is arranged in the first cavity 14, the drawer 18 being movable between a pulled-out position (FIG. 3) and a pushed-in position (FIG. 2). A hopper 20 is arranged in the drawer 18 for accommodating sheets stacked thereon. A pick roller 24 is arranged to deliver sheets one by one from the hopper 20 in a known manner. A sheet separating roller 26 cooperating with a frictional member (not shown) is arranged to separate sheets to prevent a plurality of sheets from being conveyed together. It is possible to arrange the drawer 18 in the lower cavity 16 and the stacker in the upper cavity 14.

Sheet conveying rollers 28, 28A, and 28B are arranged and driven by a motor (not shown) for conveying sheets along a sheet conveying path 22 formed in the apparatus from the hopper 20, i.e., when the drawer 18 is in the pushed-in position, i.e., to the second cavity 16 functioning as the stacker. The sheet conveying path 22 includes a curved portion (U-turn portion) between the first and second cavities 14 and 16, the curved portion being formed by a side cover 30 attached to the casing 12 and having a concave surface, and a guide member 32 positioned inside the side cover 30 and having a complementary convex surface. Sheets are guided through a gap between the concave and convex surfaces.

An upper data processing head 34 is arranged in the drawer 18 above the sheet conveying path 22 to act on the upper surface of the delivered sheet and a lower data processing head 36 is arranged in the drawer 18 below the sheet conveying path 22 to act on the lower surface of the delivered sheet. The sheet conveying rollers 28A, and 28B function as platen rollers for the upper and lower data processing heads 34 and 26. The upper and lower data processing heads 34 and 36 can includes image reading heads. Alternatively, the upper and lower data processing heads 34 and 36 can includes printing heads. It is possible to use conventional or commercially available image reading heads or printing heads.

The drawer 18 has a sufficient height to allow many sheets to be stacked on the hopper 20, and the hopper 20 is at a lower position in the drawer 18. The left, upper sheet conveying roller 28 arranged in the drawer 18 on the exit side thereof is at a higher position so that the curved portion (U-turn portion) of the sheet conveying path 22 can have a larger radius of curvature. Therefore, a portion of the sheet conveying path 22 formed within the drawer 18 is upwardly inclined from the sheet separating roller 26 toward the left sheet conveying roller 28. Therefore, there are suitable spaces within the drawer 18 for arranging the upper and lower data processing head 34 and 36, and it is not necessary to unreasonable increase the size of the data processing apparatus 10, as compared with the case in which only the upper data processing head 34 is provided.

Figure 4:
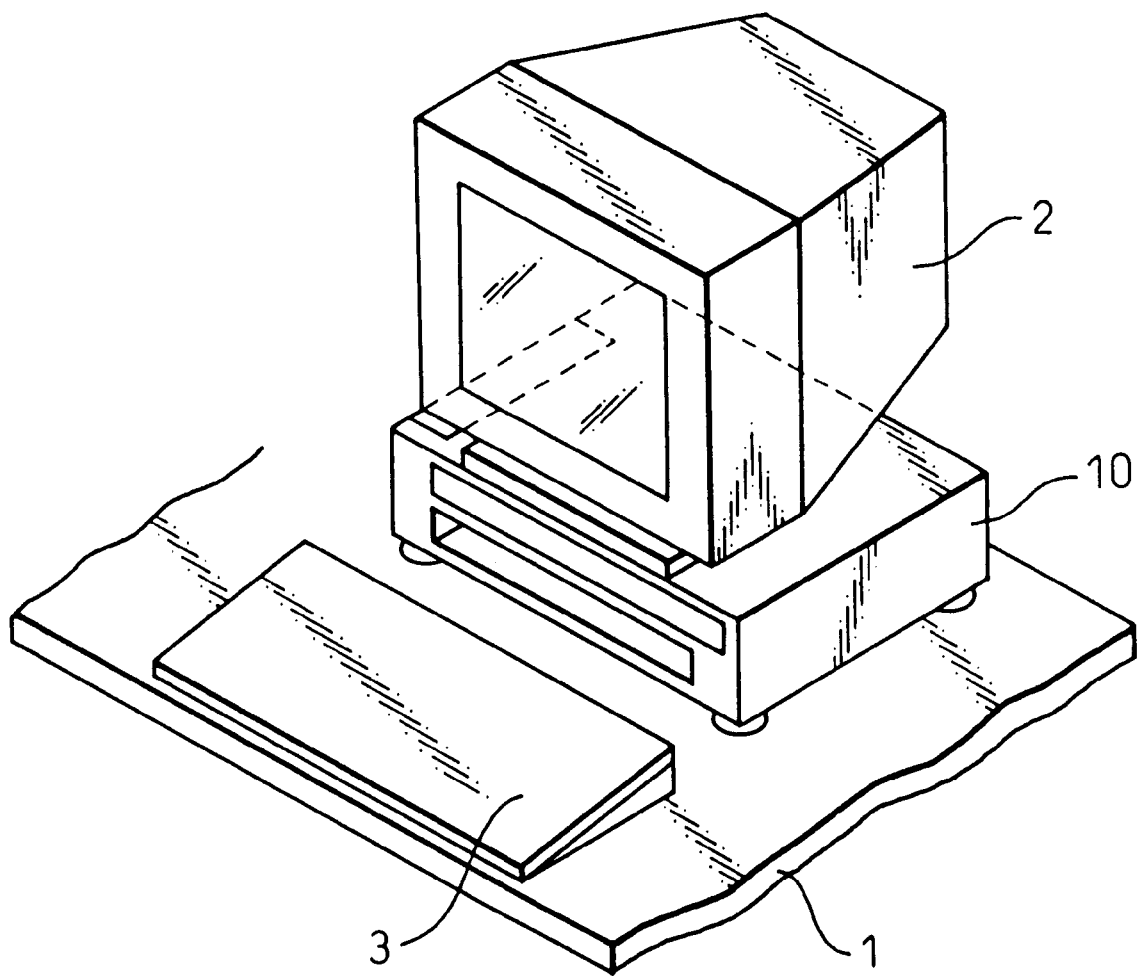
FIG. 4 is a perspective view of a personal computer system including the apparatus of FIG. 1.

FIG. 4 shows a personal computer system including the data processing apparatus 10 of FIG. 1. The data processing apparatus 10 is arranged on a desk 1, and a personal computer 2 is placed on the data processing apparatus 10. A keyboard 3 is also arranged on the desk 1. The top wall of the casing 12 of the data processing apparatus 10 is solid and no functional element is arranged in the top wall of the casing 12, so it is possible to place the personal computer 2 on the casing 12. In this way, the data processing apparatus 10 can be placed in a restricted area and the space around the apparatus can be used. In addition, the data processing apparatus 10 can process (i.e., read or print) data on both surfaces of the delivered sheet.

Figure 5:
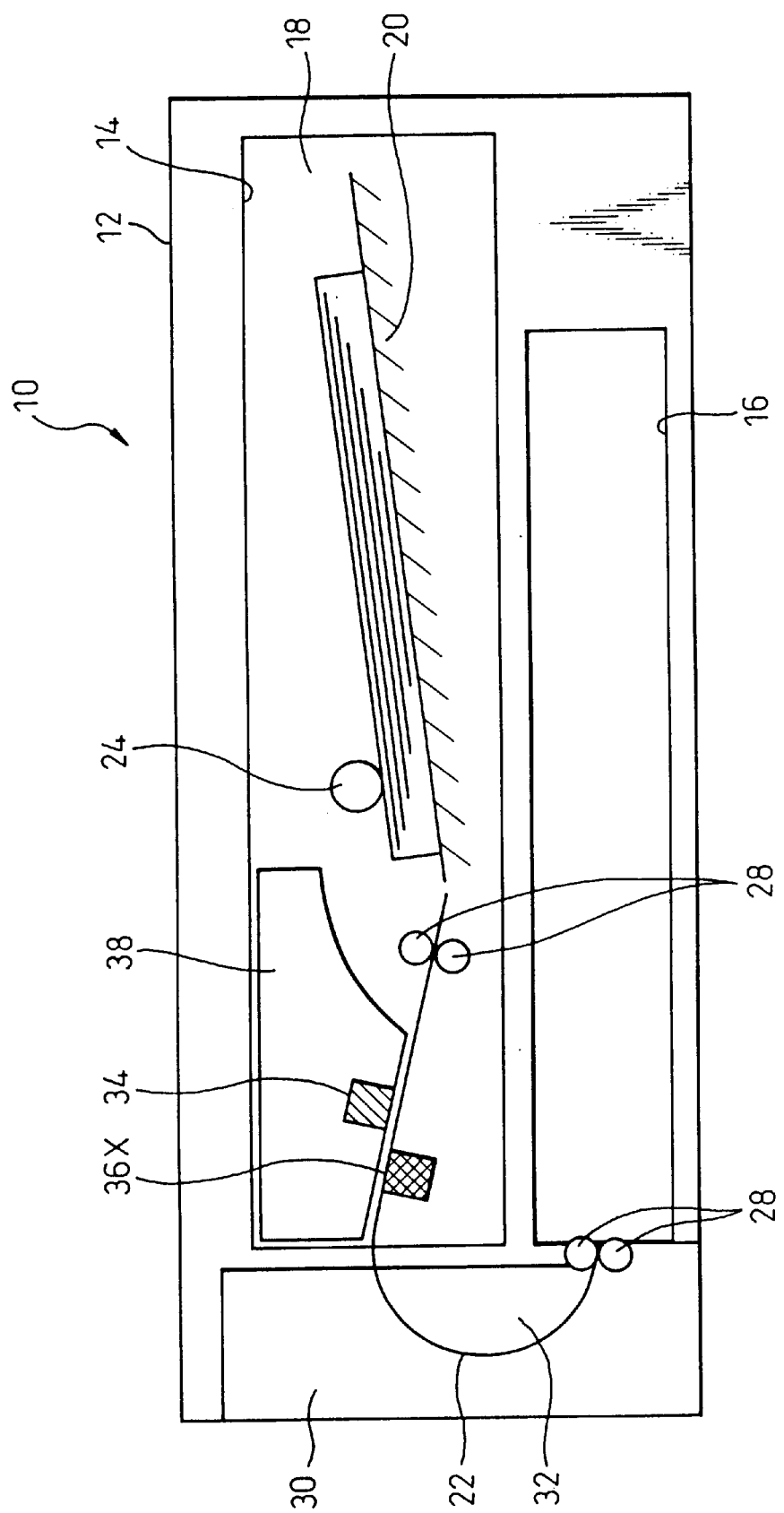
FIG. 5 is a diagrammatic cross-sectional view of a modified data processing apparatus.

FIG. 5 shows a modified data processing apparatus 10, which includes elements identical to those of the apparatus of FIG. 1, except that the lower data processing head 36 is detachably attached to the drawer 18. The upper data processing head 34 is a standard component of the data processing apparatus 10 and is arranged in an upper unit 38. The lower data processing head 36 is an optional component of the data processing apparatus 10. Therefore, a user who wants the data processing capability on both surfaces of a sheet can use the data processing apparatus 10 having the upper and lower data processing heads 34 and 36. Also, another user who wants the data processing capability on one surface only of a sheet can use the data processing apparatus 10 having the upper data processing head 34 only.

Figure 6:
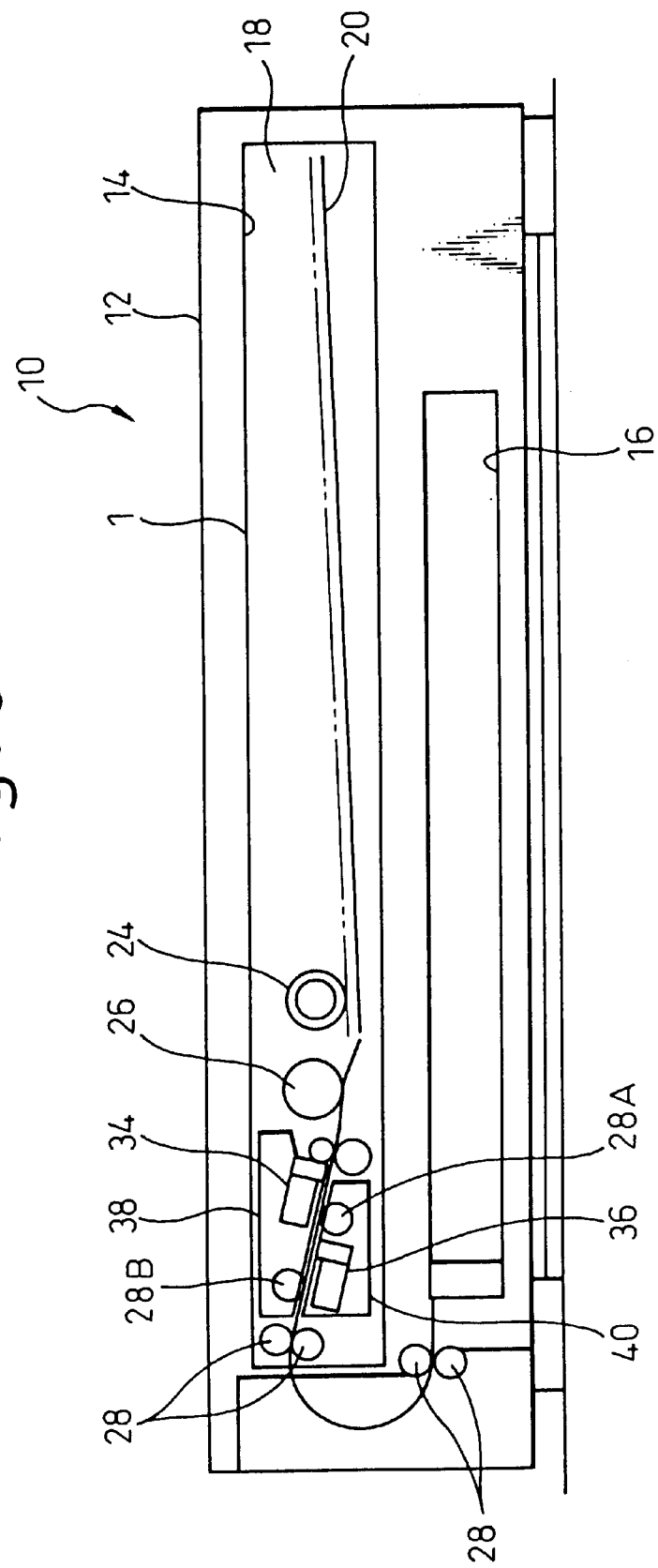
FIG. 6 is a diagrammatic cross-sectional view of a further modified data processing apparatus.

FIG. 6 shows a further modified data processing apparatus 10, which includes elements identical to those of the apparatus of FIG. 1, except that the upper data processing head 34 and the sheet conveying roller 28B are arranged in an upper unit 38 and the lower data processing head 36 and the sheet conveying roller 28A are arranged in a lower unit 40. The upper and lower unit 38 and 40 can be attached to or detached from the drawer 18, respectively. Therefore, the lower unit 40 can be removed from the apparatus 10 if the lower data processing head 36 is not necessary. In this case, a roller unit (not shown) is attached to the drawer. This roller unit has an outer profile similar to that of the lower unit 40, the sheet conveying roller 28A, and a sheet conveying roller at the position of the lower data processing head 36, so that sheets or documents can be smoothly and stably conveyed.

Figure 7:
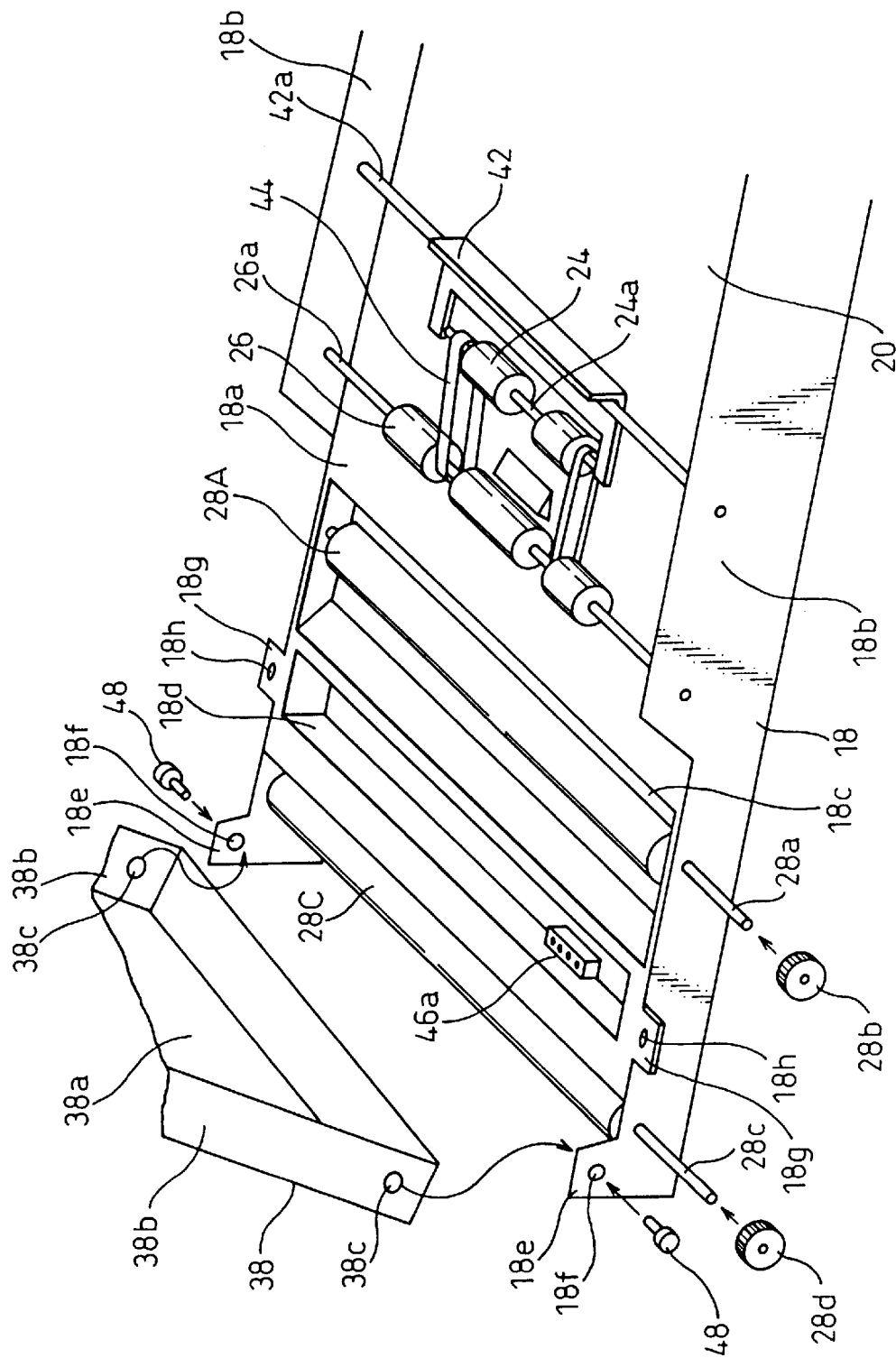
FIG. 7 is a perspective view illustrating the detail of the drawer of FIG. 5, with the upper unit partly removed.
Figure 8:
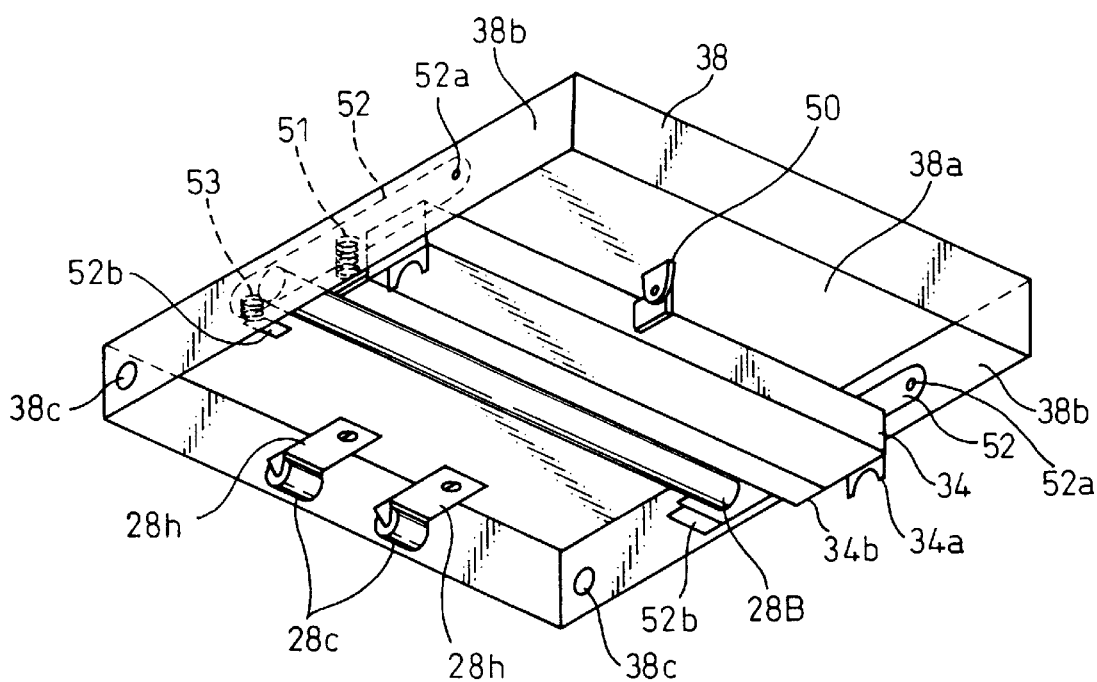
FIG. 8 is a perspective view, from bottom, of the upper unit.

FIG. 7 shows the detail of the drawer 18 of FIG. 5, with the upper unit 38 partly removed. FIG. 8 is a perspective view, from bottom, of the upper unit 38, and FIG. 9 is a perspective view of the lower data processing head 36. The drawer 18b includes an inclined base panel 18a, and side panels 18b, as shown in FIG. 7. The base panel 18a has first and second openings 18c and 18d. The sheet conveying roller 28A acting as the platen roller for the upper data processing head 34 is arranged in the first opening 18c and its shaft 28a extends through the side panels 18b and is supported by bearings (not shown). A gear 28b is attached to the end of the shaft 28a.

A connector 46a is attached to the side wall of the second opening 18d. Lateral flaps 18g extend laterally from the base panel 18a at the position of the second opening 18d, the lateral flaps 18g having threaded holes 18h. Rising flaps 18e extend upwardly from the side panels 19b at the exit end of the drawer 18, the rising flaps 18e having holes 18f. The sheet conveying roller 28c is arranged near the exit end of the drawer 18 and its shaft 28c extends through the side panels 19b is supported by bearings (not shown). A gear 28d is attached to the end of the shaft 28c.

The lower data processing head 36 has lateral flaps 36a which have elongated holes 36b, as shown in FIG. 9. The lower data processing head 36 also has a connector 46b. The lower data processing head 36 is inserted in the second opening 18d of the drawer 18 from above so that the lateral flaps 36a of the lower data processing head 36 rest on the lateral flaps 18g of the drawer 18 and the connector 46b is engaged with the connector 46a. Screws (not shown) can be inserted through the holes 36b of the lower data processing head 36 and threaded into the threaded holes 18h of the drawer 18 to thereby fix the lower data processing head 36 to the drawer 18.

A dummy head 37 having lateral flaps 37a and elongated holes 37b is prepared, as shown in FIG. 10. The dummy head 37 is of a similar shape to the lower data processing head 36, except that the dummy head 37 has no data processing function, i.e., no image reading function and no printing function. The dummy head 37 can be attached to the drawer 18 at the position of the lower data processing head 36 when a user does not wish to use the lower data processing head 36 to close the opening so that the sheet can be smoothly conveyed.

The upper unit 38 includes a top panel 38a and side panels 38b, as shown in FIGS. 7 and 8. The side panels 38b have holes 38c at the exit end thereof, and therefore, pins 48 or similar can be inserted through the holes 18f of the drawer 18 and the holes 38c of the upper unit 38 to thereby pivotally couple the upper unit 38 with the drawer 18. The upper data processing head 34 is supported by the top panel 38a via a pivotable support member 50 and has side flaps 34a shaped to straddle the shaft 28a of the sheet conveying roller 28A. The upper data processing head 34 has a plate portion 34b which is biased by springs 51 toward the sheet conveying roller 28A, so that the upper data processing head 34 can closely contact the sheet conveying roller 28A. The sheet conveying roller 28B acting as the platen roller for the lower data processing head 36 is supported by the side panels 36b via support arms 52 which extend parallel to the side panels 38b and are pivotably attached to the side panels 38b by pivots 52a. The support arms 52 have projections 52b which are biased by springs 53 toward the lower data processing head 36. In addition, a pinch roller, includes short rollers 28C', i.e., is arranged near the exit end of the drawer 18 for cooperation with the sheet conveying roller 28C in FIG. 7. The pinch rollers 28C' are supported by the top panel 38a via flexible support members 28h.

Figure 11:
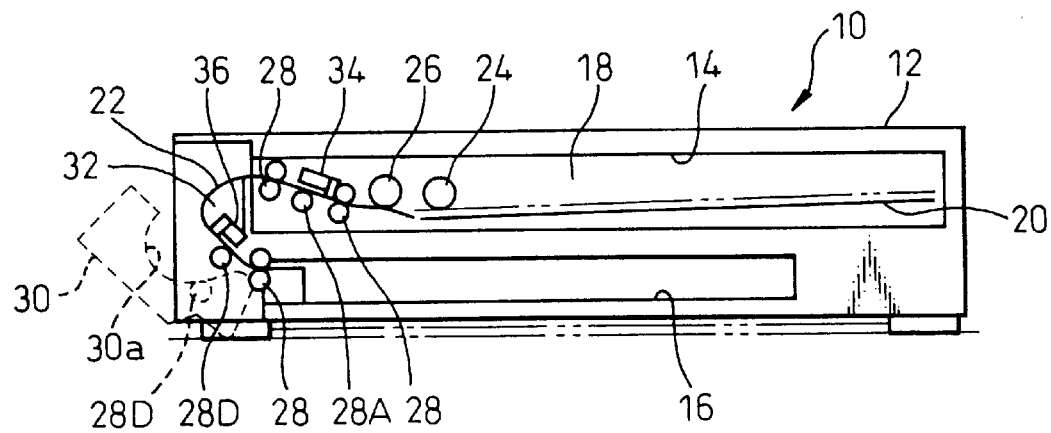
FIG. 11 is a diagrammatic cross-sectional view of a data processing apparatus according to the second embodiment of the present invention.

FIG. 11 shows a data processing apparatus according to the second embodiment of the present invention. The data processing apparatus 10 includes a casing 12 having a first cavity 14 and a second cavity 16 serving as a stacker. A drawer 18 is arranged in the first cavity 14, the drawer 18 being movable between a pull-out position and a pushed-in position. A hopper 20 is arranged in the drawer 18 for accommodating sheets stacked thereon. A pick roller 24 and a sheet separating roller 26 are also provided inside the drawer.

Figure 13:
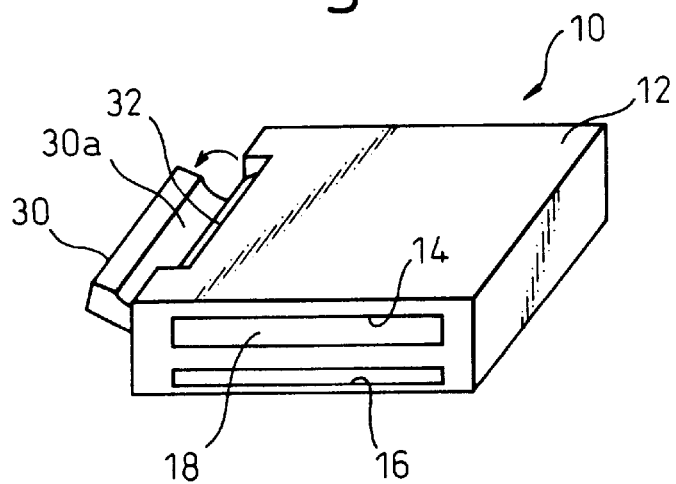
FIG. 13 is a perspective view of the apparatus of FIG. 11 with the side cover opened.
Figure 14:
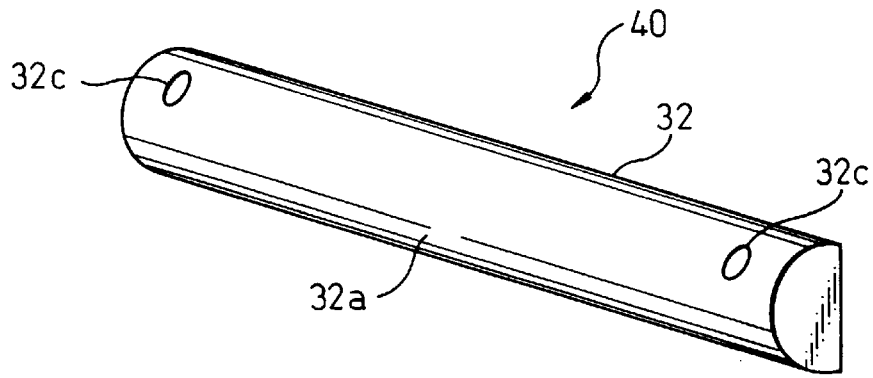
FIG. 14 is a perspective view of the guide member having the lower date processing head incorporated therein of FIG. 11.

Sheet conveying rollers 28, 28A, and 28D are arranged along a sheet conveying path 22 including a curved portion (U-turn portion) which is formed by a side cover 30 having a concave surface 30a (FIG. 13) and a guide member 32 having a complementary convex surface 32a (FIG. 14). Sheets are guided between the concave surface 30a and the convex surface 32a. The side cover 30 is a hinged door and is movable between an open position and a closed position. Therefore, it is possible to remove a sheet which is jammed in the apparatus, by opening the side cover 30.

An upper data processing head 34 is arranged in the drawer 18 above the sheet conveying path 22 to act on the upper surface of the delivered sheet. A lower data processing head 36 is arranged or incorporated in the guide member 32 to act on the lower surface of the delivered sheet. The sheet conveying rollers 28A and 28D also act as platen rollers. The upper and lower data processing heads 34 and 36 include image reading heads or printing heads. The sheet conveying roller 28D is carried by the side cover 30.

The space inside the side cover 30 was empty, or not utilized, in the conventional design or only a guide member was arranged in the space inside the side cover 30. According to this embodiment, the lower data processing head 36 can be arranged in such a space, and no extra space is necessary for arranging the lower data processing head 36 in the apparatus 10. Therefore, it is not necessary to increase the size of the data processing apparatus 10 even if the lower data processing head 36 is added to the upper data processing head 34.

Figure 12:
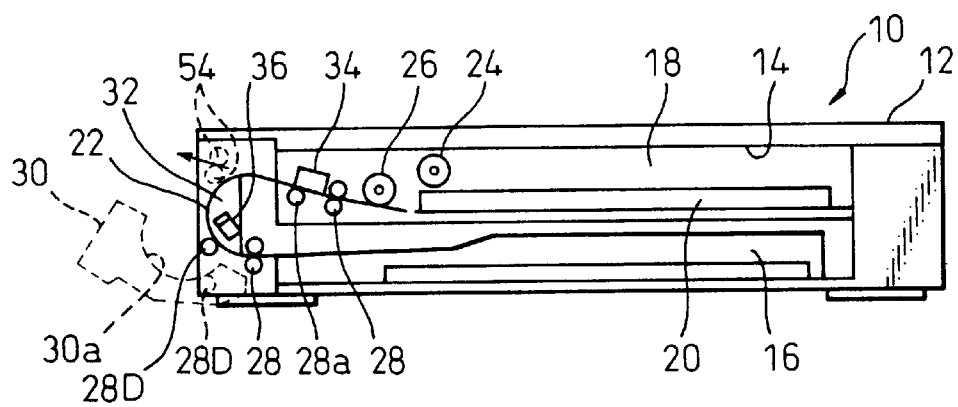
FIG. 12 is a diagrammatic view of a modified data processing apparatus.

FIG. 12 shows a modified data processing apparatus 10 which includes additional sheet guide rollers 54, by which a straight discharge path is formed in the direction of the arrow. In addition, it is possible to use the data processing apparatus 10 in this and other embodiments under the condition where the drawer 18 is in the pulled-out position since the drawer 18 includes the upper data processing head 34 and the sheet conveying rollers 28.

Figure 15:
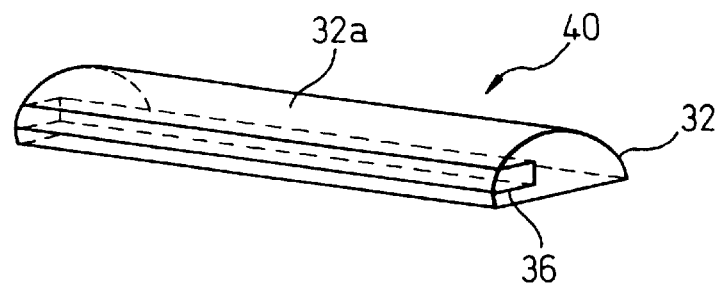
FIG. 15 is a perspective view of the guide member of FIG. 14, viewed in the different direction.
Figure 16:
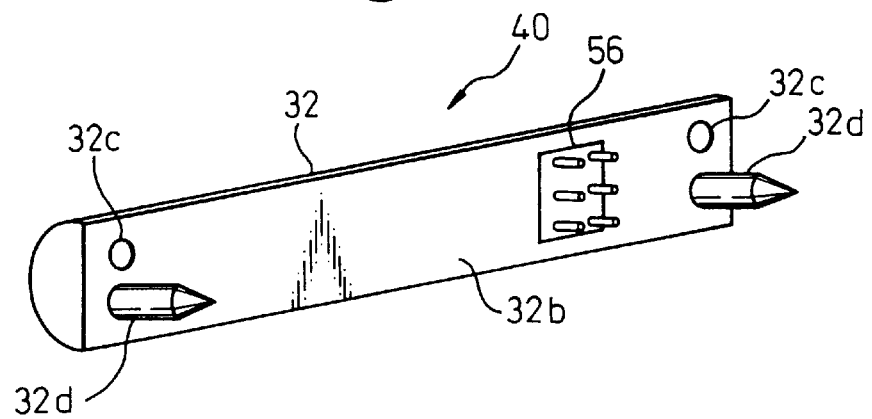
FIG. 16 is a perspective view of the guide member of FIG. 14, viewed in the further different direction.
Figure 17:
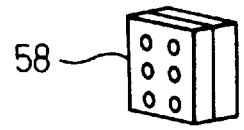
FIG. 17 is a perspective view of the connector attached to the casing.
Figure 18:
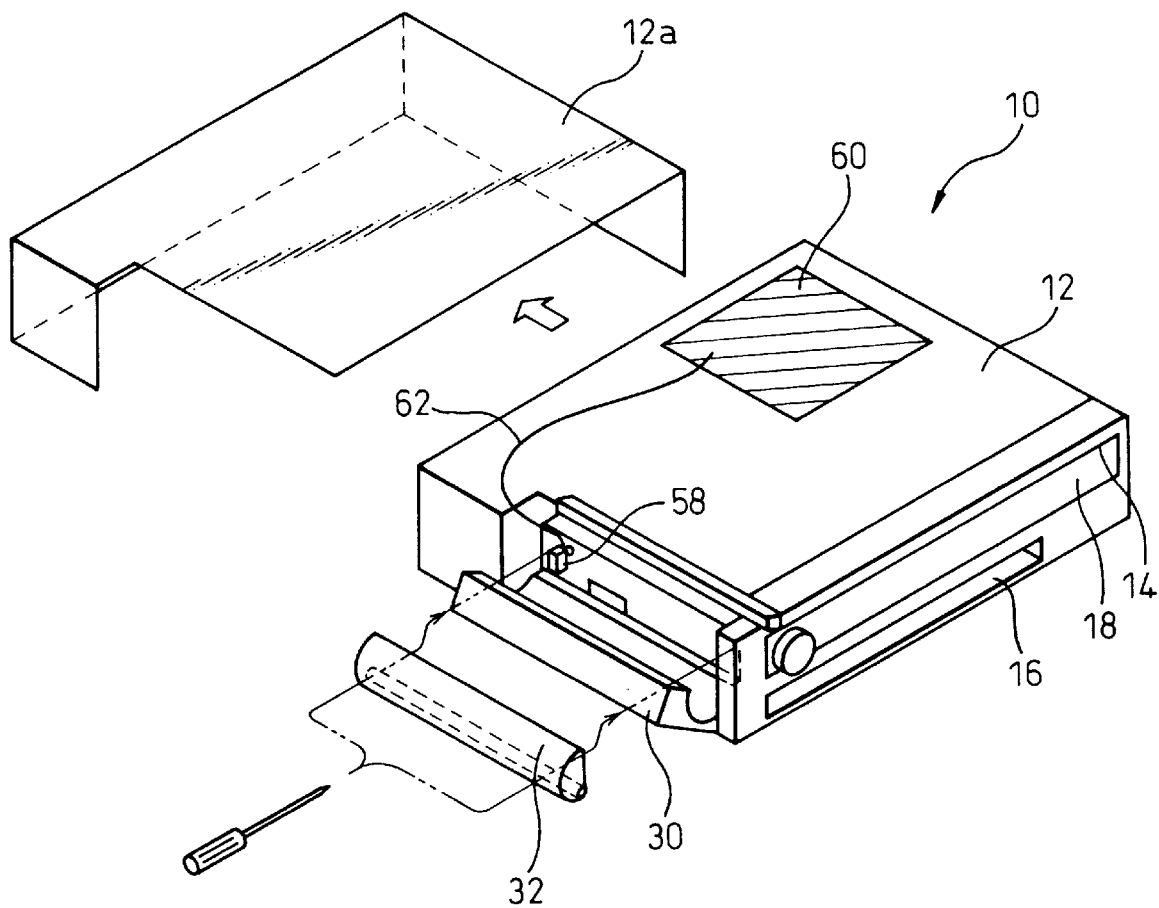
FIG. 18 is an exploded perspective view of the data processing apparatus of FIG. 11.
Figure 19:
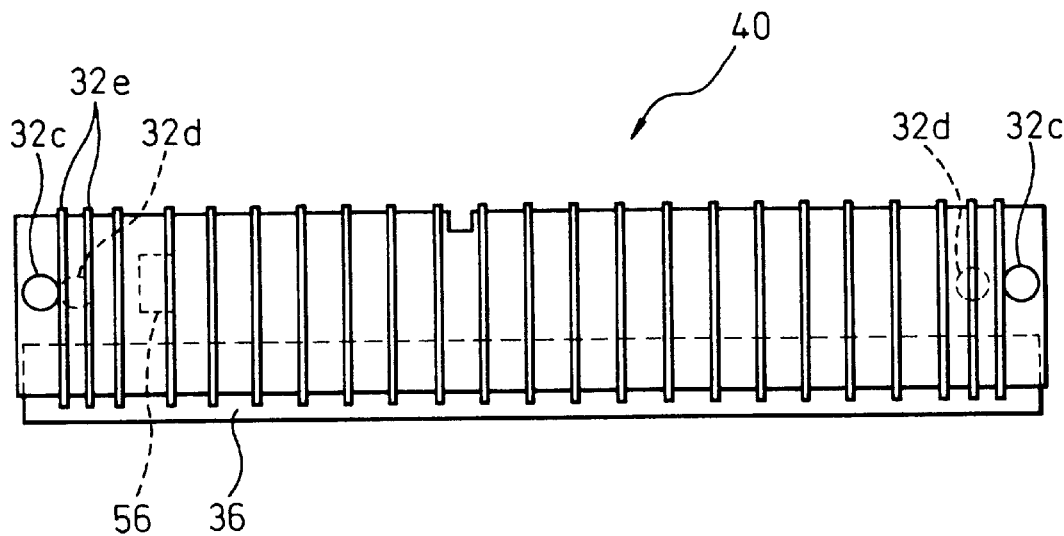
FIG. 19 is a front view of the guide member in greater detail, viewed in the direction of the arrow XIX in FIG. 22.

FIGS. 14 to 16 show the guide member 32 having the lower data processing head 36 incorporated therein. The guide member 32 has the convex, curved surface 32a, a flat rear surface 32b, threaded holes 32c, locating pins 32d, and a connector 56. FIG. 17 shows a connector 58 which is arranged in the casing 12 to receive the connector 56 of the guide member 32 when the latter is attached to the casing 12. The connector 56 includes pins which are resiliently urged against the connector 58. FIG. 18 illustrates the attaching operation of the guide member 32 to the casing 12. In this operation, the rear surface 32b of the guide member 32 is applied to the casing 12, and screws (not shown) are inserted into the holes 32c. The casing 12 has an upper or side cover 12a, and a printed wiring board 60 may be revealed when the upper cover 12a is removed. A lead wire or cable 62 extends in the casing 12 to connect the connector 58 with the printed wiring board 60.

FIGS. 19 to 22 also show the guide member 32 having the lower data processing head 36 incorporated therein in greater detail, and FIGS. 2.3 and 24 show a side end portion of the casing 12 to which the guide member 32 is detachably attached. The guide member 32 has the convex, curved surface 32a, the flat rear surface 32b, holes 32c, locating pins 32d, and the connector 56, as described above. The convex surface 32a is formed by curved ribs 32e. The guide member 32 is a molded plastic article, and the lower data processing head 36 is attached to the bottom of the guide member 32 and fastened to the guide member 32 by screws 36e. The lower data processing head 36 includes a contact type image reading device which can read information or data on the surfaces of the sheets. The sheet conveying roller 28D is carried by the side cover 30 and acts as a platen roller for the lower data processing head 36.

Figure 20:
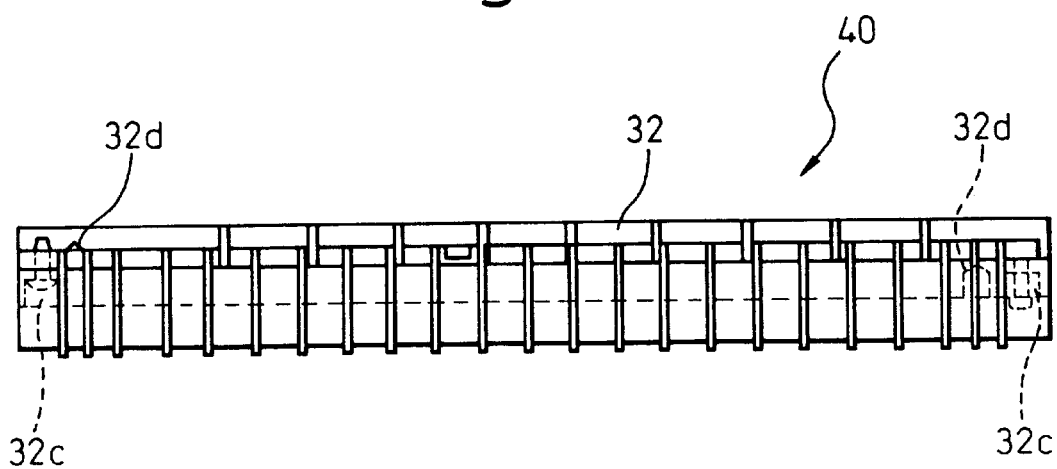
FIG. 20 is a top view of the guide member of FIG. 19, viewed in the direction of the arrow XX in FIG. 22.
Figure 21:
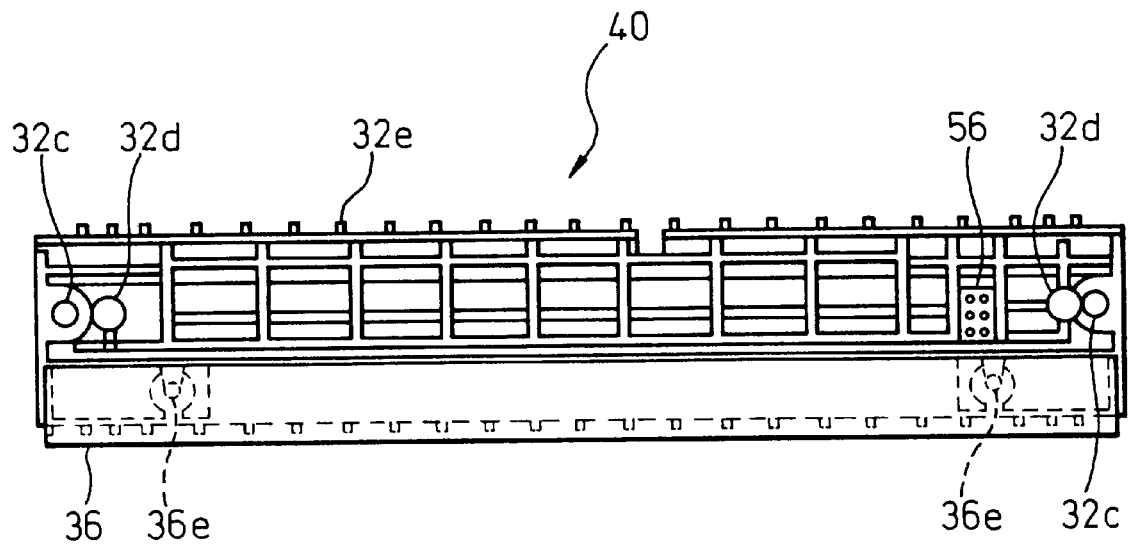
FIG. 21 is a rear view of the guide member of FIG. 19, viewed in the direction of the arrow XXI in FIG. 22.
Figure 22:
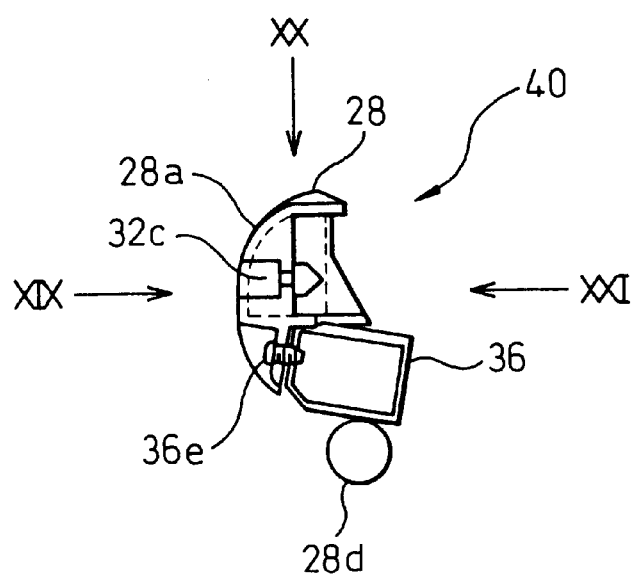
FIG. 22 is a side view of the guide member of FIG. 19.
Figure 23:
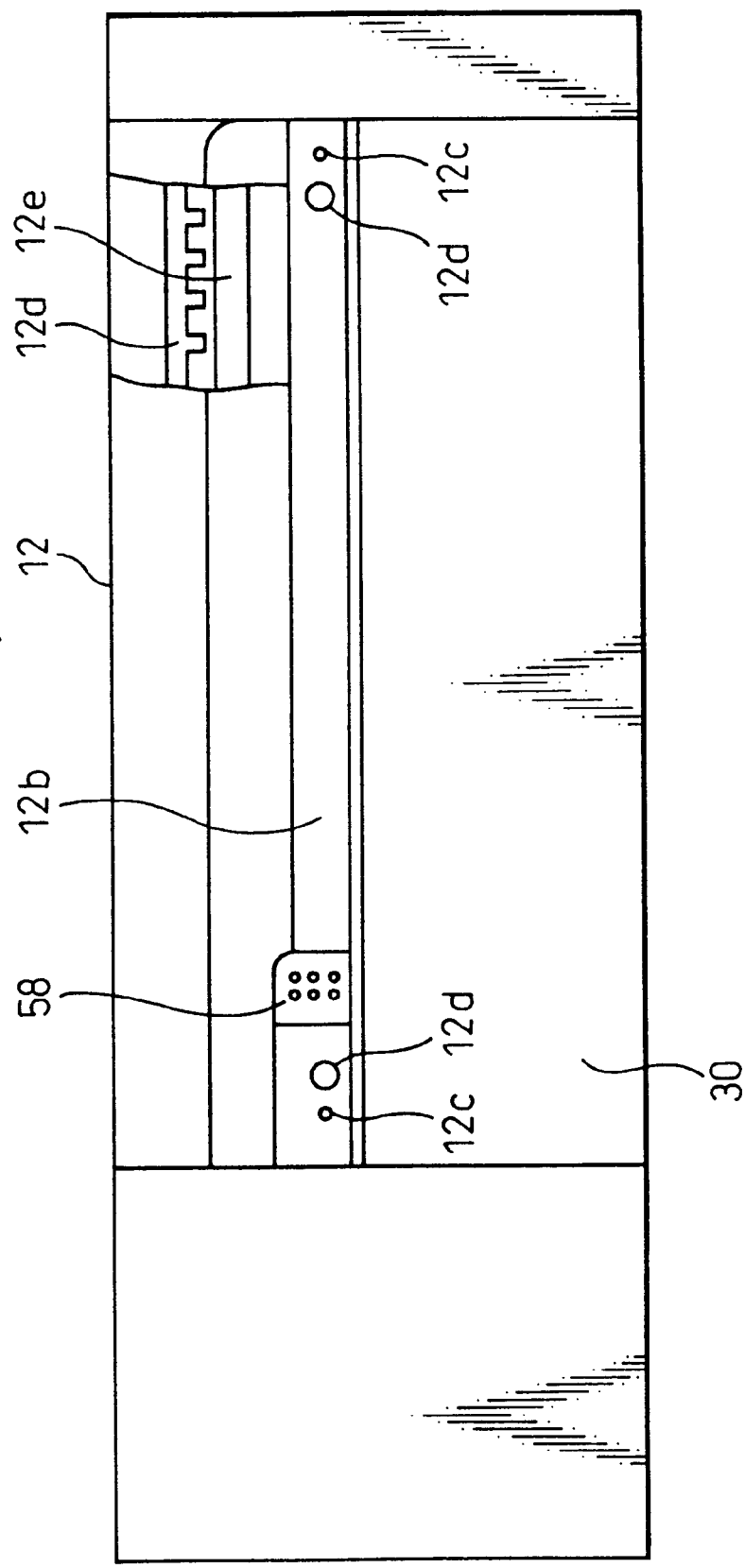
FIG. 23 is a side view of the casing to which the guide member of FIGS. 19 to 22 is attached.
Figure 24:
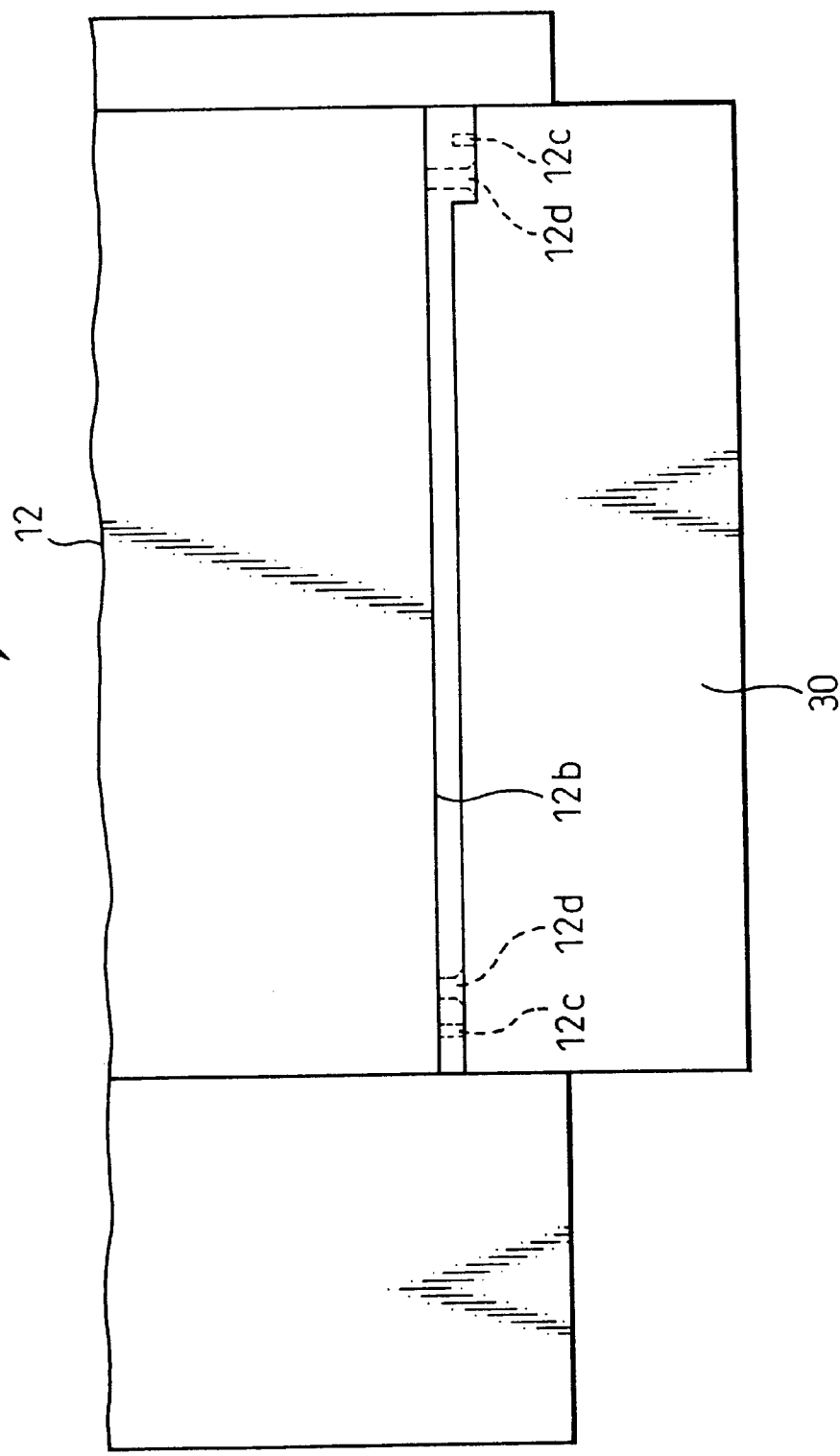
FIG. 24 is a top view of the casing of FIG. 23.

The casing 12 has an inner wall 12b. The side cover 30 is shown in the open position in FIGS. 23 and 24, and the inner wall 12b is located above the side cover 30 when it is in the open position. Therefore, it is possible to attach the guide member 32 to the inner wall 12b of the casing 12 or detach the guide member 32 from the inner wall 12b of the casing 12, using a driver, as shown in FIG. 18. The inner wall 12b has threaded holes 12c corresponding to the holes 32c of the guide member 32 to receive screws, locating holes 12d corresponding to the locating pins 32d, and the connector 58 corresponding to the connector 56. The right wall portion, i.e., having the right pair of threaded hole 12c and locating hole 12d, i.e., rearwardly projects from the remaining portion of the inner wall 12b, as shown in FIG. 24, and the right wall portion, i.e., having the right pair of hole 32c and locating hole 32, i.e., is retracted from the left wall portion having the left pair of hole 32c and locating hole 32, as shown in FIG. 20. Therefore, the guide member 32 can be attached to the casing 12 maintaining the right-right and left-left relationship.

In an actual design, the connector 58 includes a printed wiring board having printed conductors in place of jack elements, and the connector 56 of the guide member 32 is a spring-push type connector in which pins are elastic members. Therefore, the pins of the connector 56 of the guide member 32 are elastically forced against the printed conductors of the connector 58 to establish an electric connection between the connectors 56 and 58 when the guide member 32 is attached to the casing 12. FIG. 23 also shows guide members 12e and 12f, so that the sheets are conveyed by the sheet conveying rollers 28 in the drawer 18 through the guide members 12e and 12f to the curved portion of the sheet conveying path 22.

Figure 25:
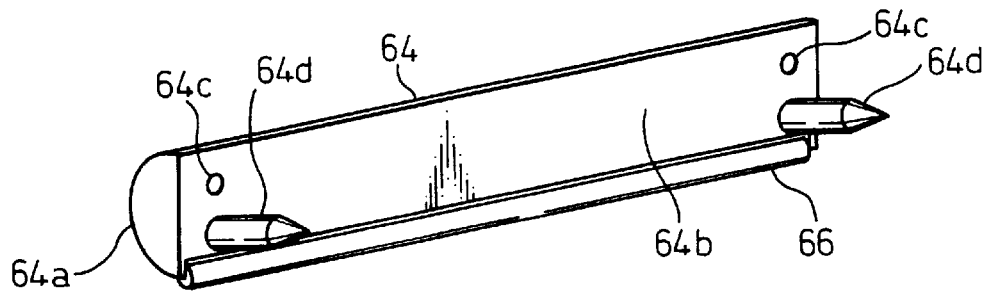
FIG. 25 is a perspective view of the dummy head attached to the casing in place of the guide member of FIGS. 19 to 22.
Figure 26:
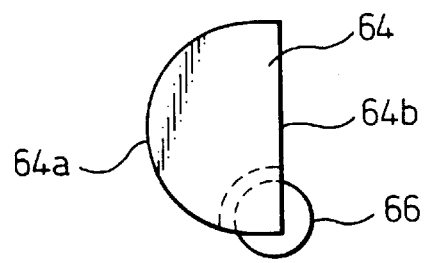
FIG. 26 is a side view of the dummy head of FIG. 25.

FIGS. 25 and 26 show a dummy head 64 which can be attached to the inner wall 12b of the casing 12 in place of the guide member 32 when the latter is removed from the casing 12. The dummy head 64 has an outer profile, a guide surface 64a, a rear surface 64b, holes 64c, locating pins 64d, all similar to those of the guide member 32. The dummy head 64 does not have the lower data processing head 36 and the connector 56. Instead, the dummy head 64 has an auxiliary guide member in the form of a roller 66 at a position of the lower data processing head 36 in the guide member 32. The roller 66 cooperates with the sheet conveying roller 28D. Therefore, the sheets can be smoothly and stably conveyed even if the guide member 32 is removed from the casing 12.

Figure 27:
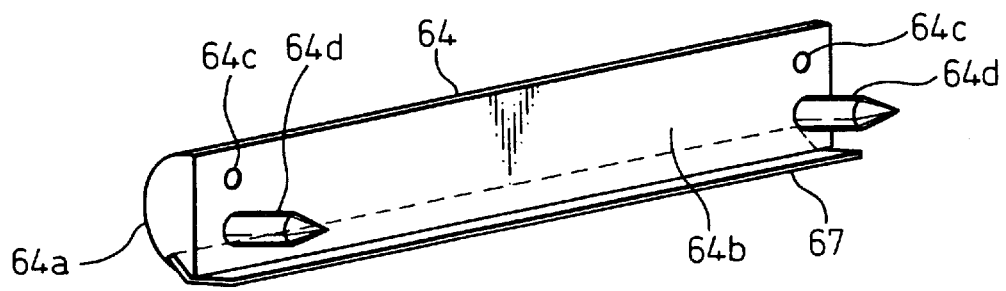
FIG. 27 is a perspective view of the modified dummy head.
Figure 28:
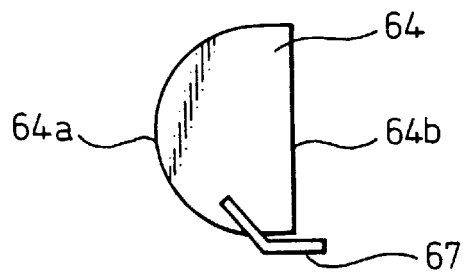
FIG. 28 is a side view of the dummy head of FIG. 27.

FIGS. 27 and 28 show a modified dummy head 64. This dummy head 64 is similar to the dummy head 64 of FIGS. 25 and 26, except for the auxiliary guide member. In FIGS. 27 and 28, the auxiliary guide member includes a steel plate 67 which is elastically forced to the sheet conveying roller 28D. In this case too, the sheets can be smoothly and stably conveyed.

Accordingly, a user who wishes the data processing capability on both surfaces of the sheet can use the data processing apparatus 10 having the upper data processing head 34 and the guide member 32 with the lower data processing head 36, and another user who wishes the data processing capability on the upper surface only of the sheet can use the data processing apparatus 10 having the upper data processing head 34 and the dummy head 64 with no data processing head. Therefore, it is possible to satisfy the demands of both above-described users. For example, it is possible to buy the data processing apparatus 10 having the upper data processing head 34 and the dummy head 64 with no data processing head, and thereafter, it is possible to replace the dummy head 64 with the guide member 32 with the lower data processing head 36. Therefore, a user who wishes the data processing capability on one surface only of the sheet can save the extra cost.

Figure 29:
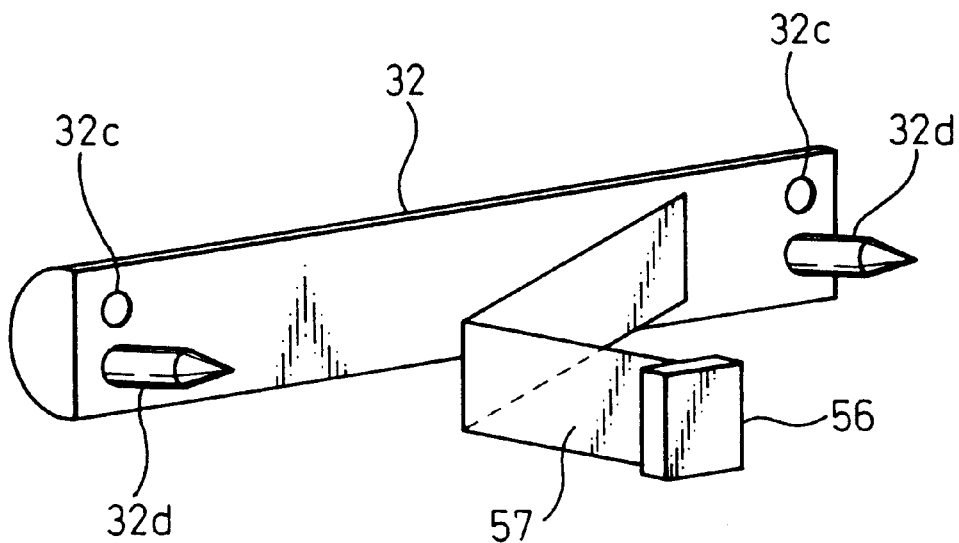
FIG. 29 is a perspective view of the guide member having a connector and a flexible cable.
Figure 30:
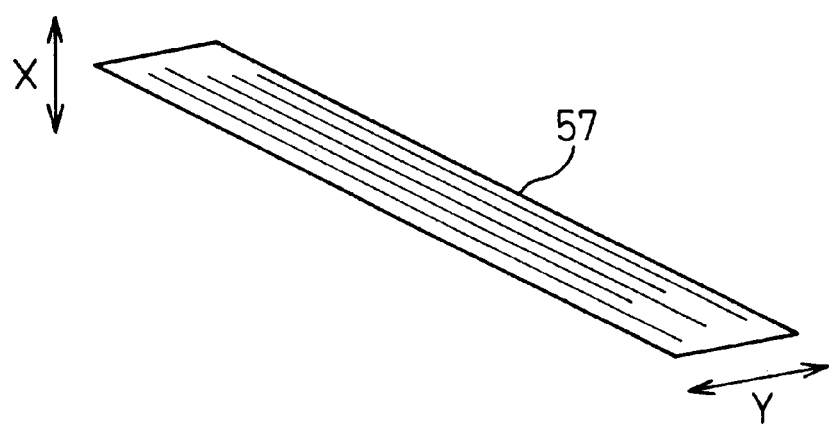
FIG. 30 is a perspective view of the flexible cable.

FIG. 29 shows a modified guide member 32 having the lower data processing head 36 (not seen in FIG. 29) and the connector 56. The guide member 32 has a flexible cable 57 and the connector 56 is attached to the free end of the flexible cable 57 so that the connector 56 can be engaged with the connector in the casing 12. The flexible cable 57 can be easily bent in the direction of the arrow X in FIG. 30, and not so easily bent in the direction of the arrow Y in FIG. 30. The flexible cable 57 is attached to the guide member 32 so that the longitudinal direction of the flexible cable 57 is parallel to the longitudinal direction of the guide member 32. Also, the flexible cable 57 is folded into two sections at the intermediate position thereof, to prevent the flexible cable 57 from hanging down. The flexible cable 57 can be accommodated in the casing without twisting.

FIGS. 31 to 43 show embodiments having image reading heads and printing heads arranged at various positions. In these figures, the character "A" shows an image reading head, and the character "B" shows a printing head. Also, the upper head is the one that acts on the upper surface of sheet when the sheet is at the hopper 20, and the lower head is the one that acts on the lower surface of sheet when the sheet is at the hopper 20, although this will already be understood.

Figure 31:
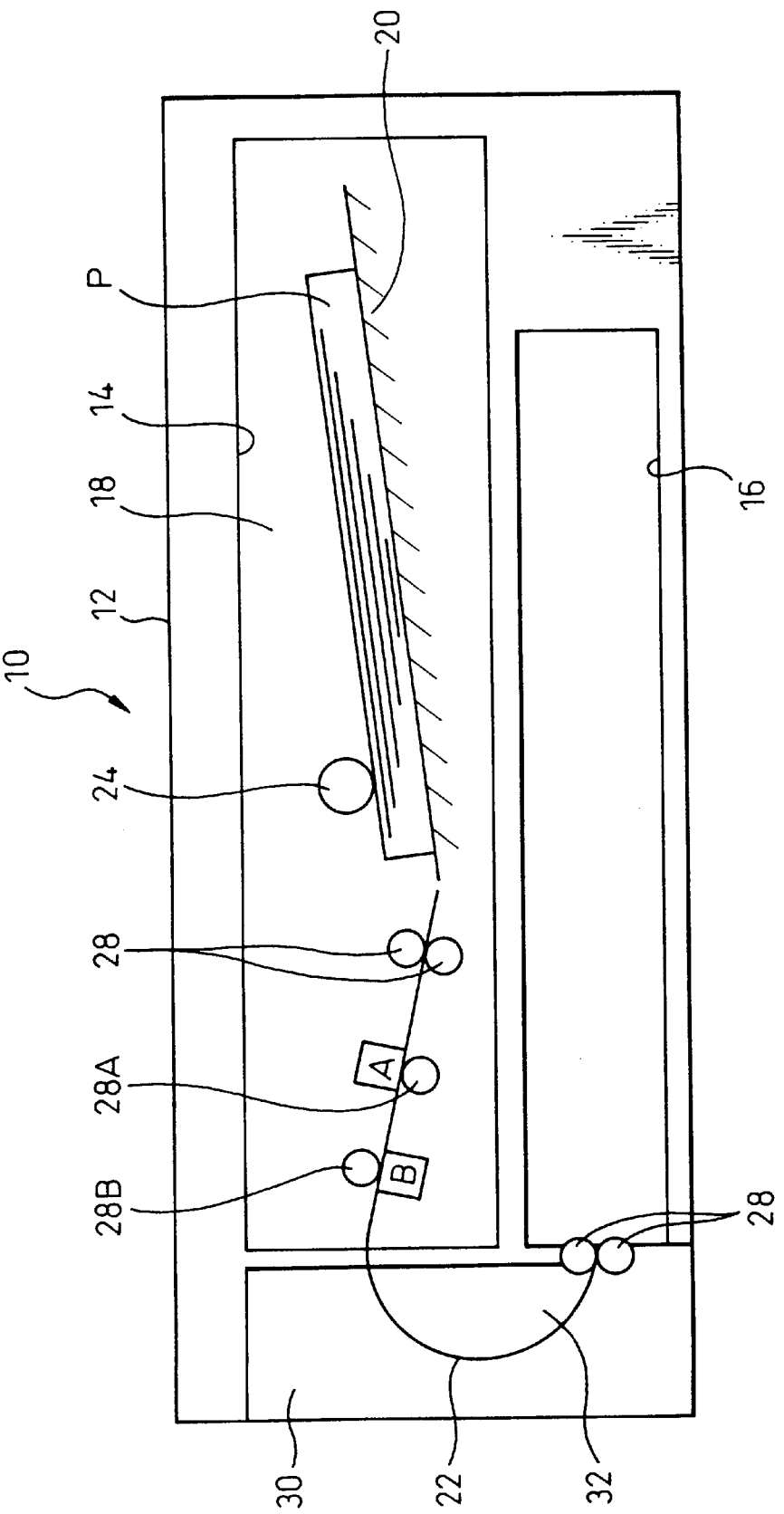
FIGS. 31 to 43 are diagrammatic cross-sectional views illustrating the data processing apparatus according to various embodiments of the present invention.

In FIG. 31, the upper image reading head "A" and the lower printing head "B" are arranged in the drawer 18 in this order after the hopper 20. The sheet conveying path 22 in the drawer 18 is upwardly tapered, and there are spaces in the drawer 18 to accommodate the upper image reading head "A" and the lower printing head "B", as described above. It is desirable to use a small printing head such as an ink jet head or a thermal head.

Figure 32:
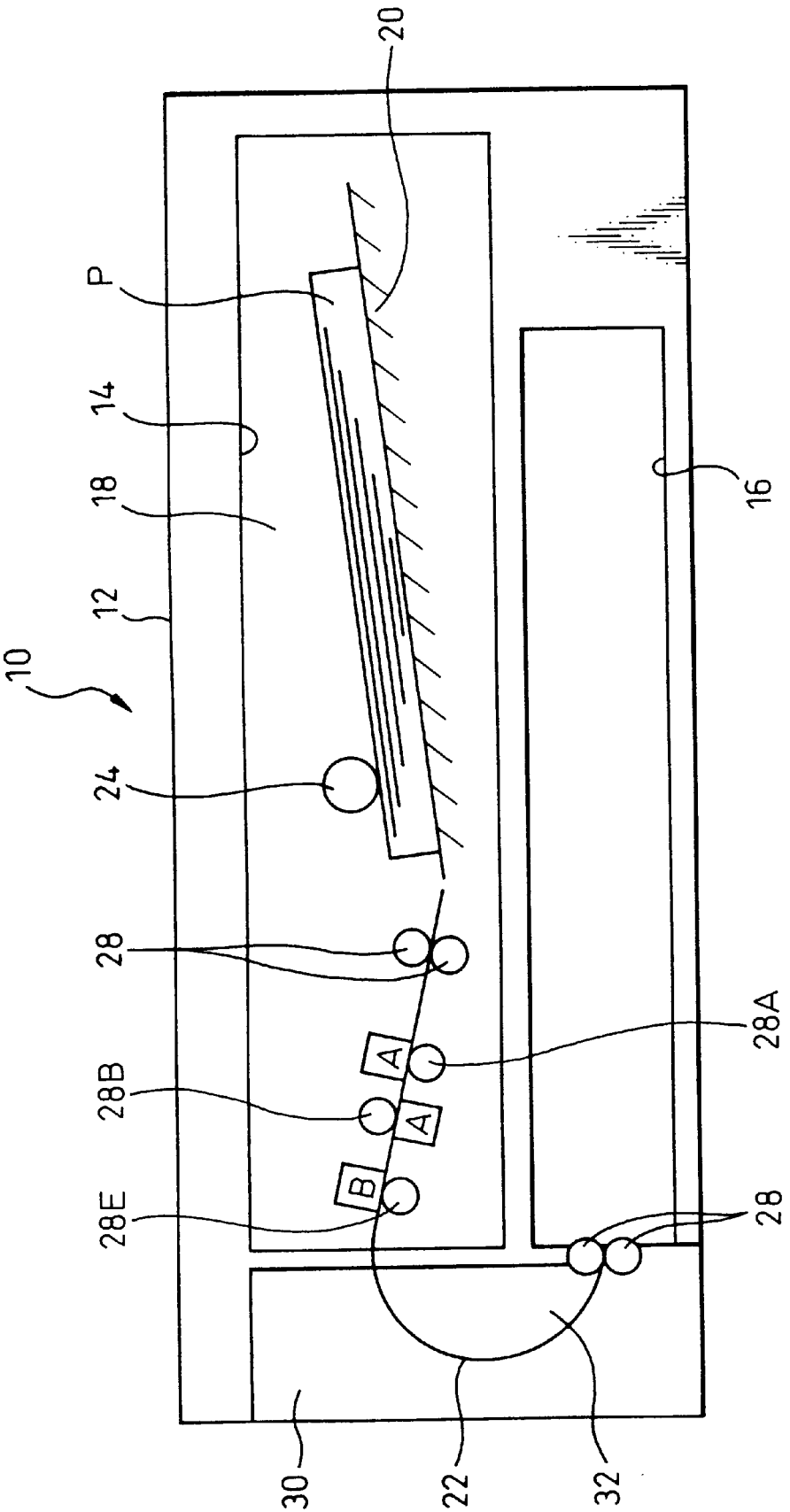

In FIG. 32, the upper image reading head "A", the lower image reading head "A" and the upper printing head "B" are arranged in the drawer 18 in this order. The upper image reading head "A" and the upper printing head "B" can be arranged as a unit or as separate units. In this data processing apparatus, it is possible to read information or data on both surfaces of the sheet and to print information or data onto the upper surface of the sheet. The upper printing head "B" is arranged after the upper and lower image reading heads "A", to print a mark indicating that information or data was certainly read.

Figure 33:
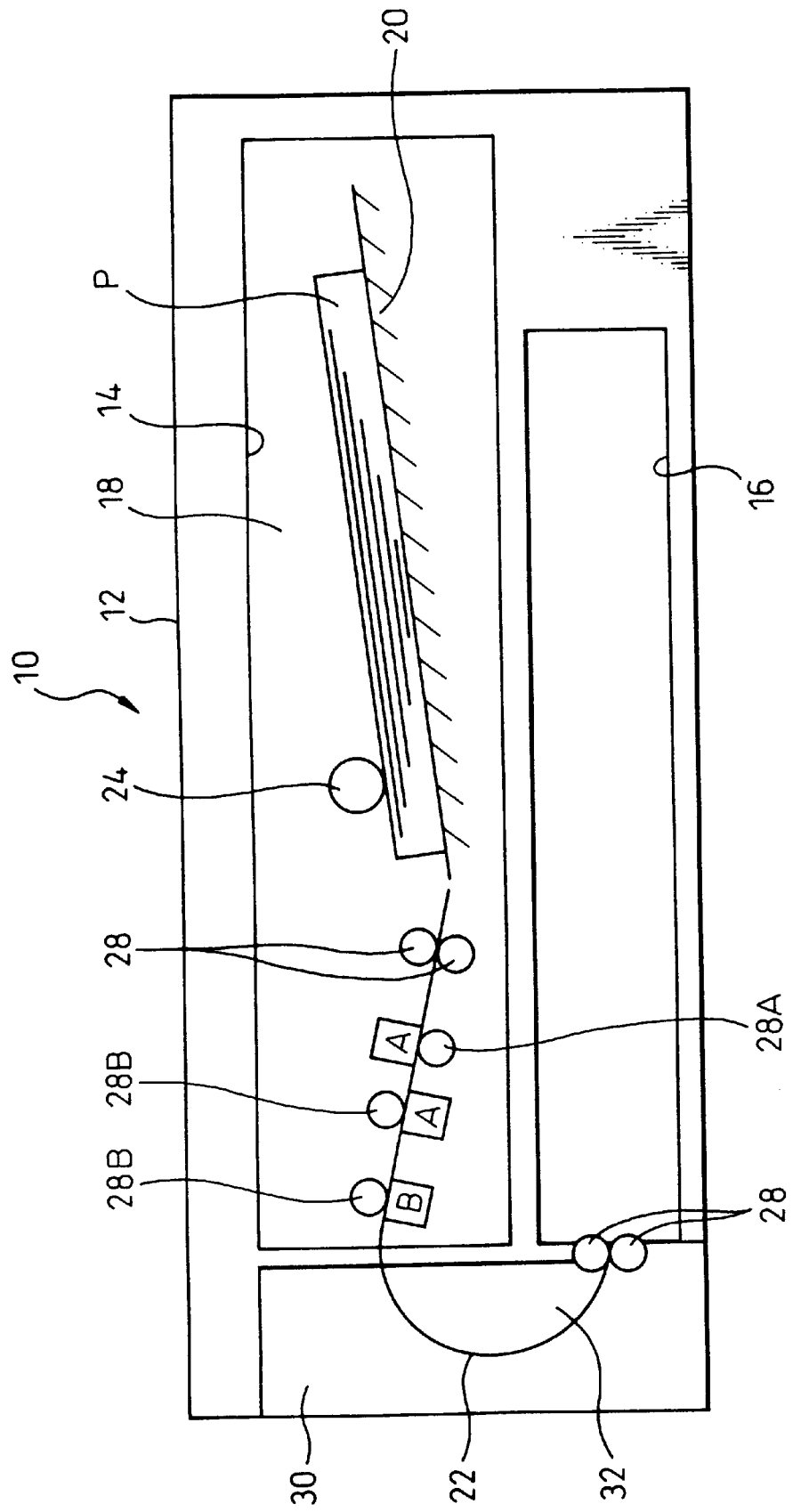

In FIG. 33, the upper image reading head "A", the lower image reading head "A" and the Lower printing head "B" are arranged in the drawer 18 in this order. This embodiment functions in a manner similar to the former embodiment.

Figure 34:
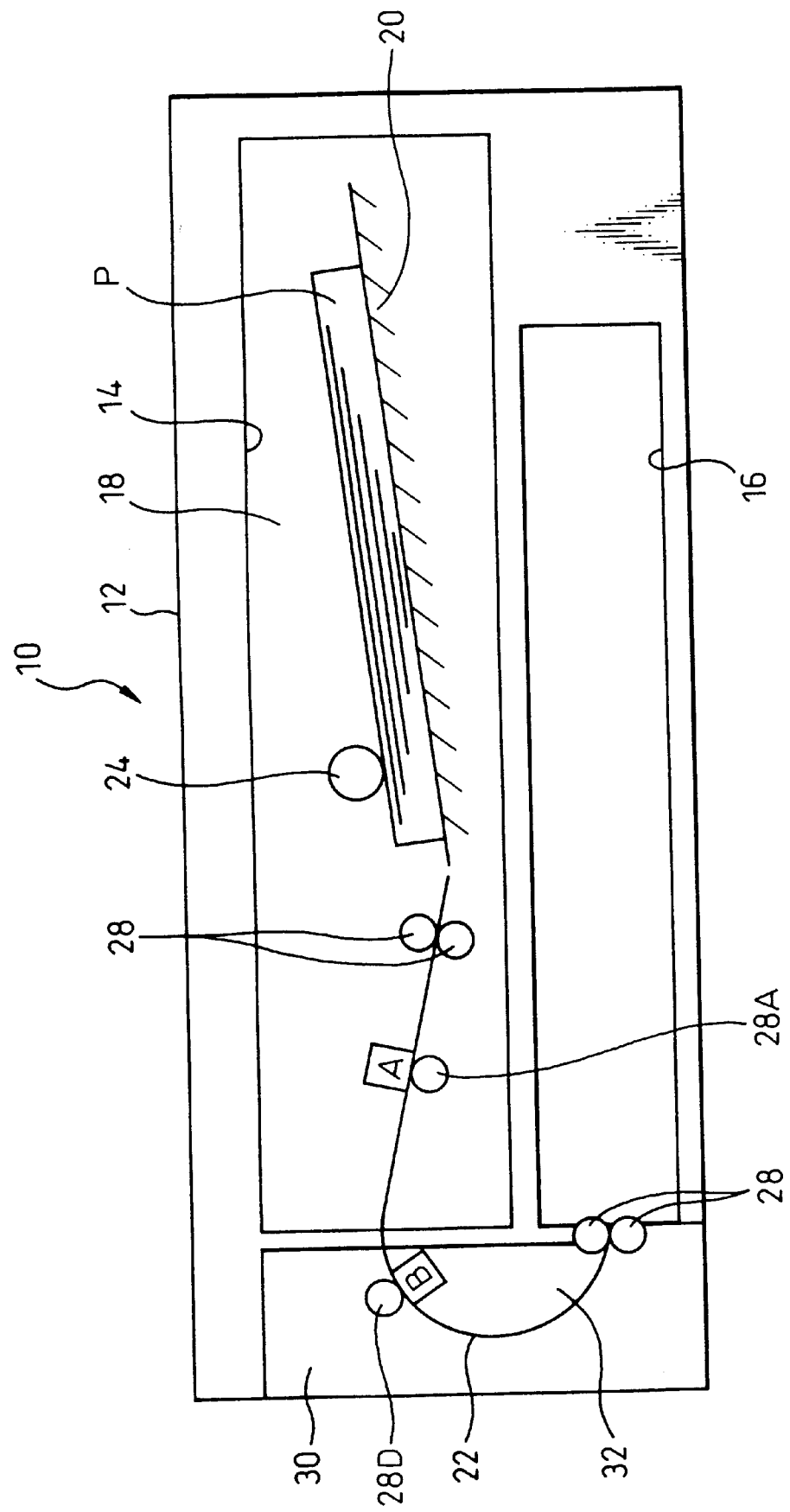

In FIG. 34, the upper image reading head "A" is arranged in the drawer 18, and the lower printing head "B" is incorporated in the guide member 32. This embodiment is similar to the embodiments of FIGS. 11 and 12.

Figure 35:
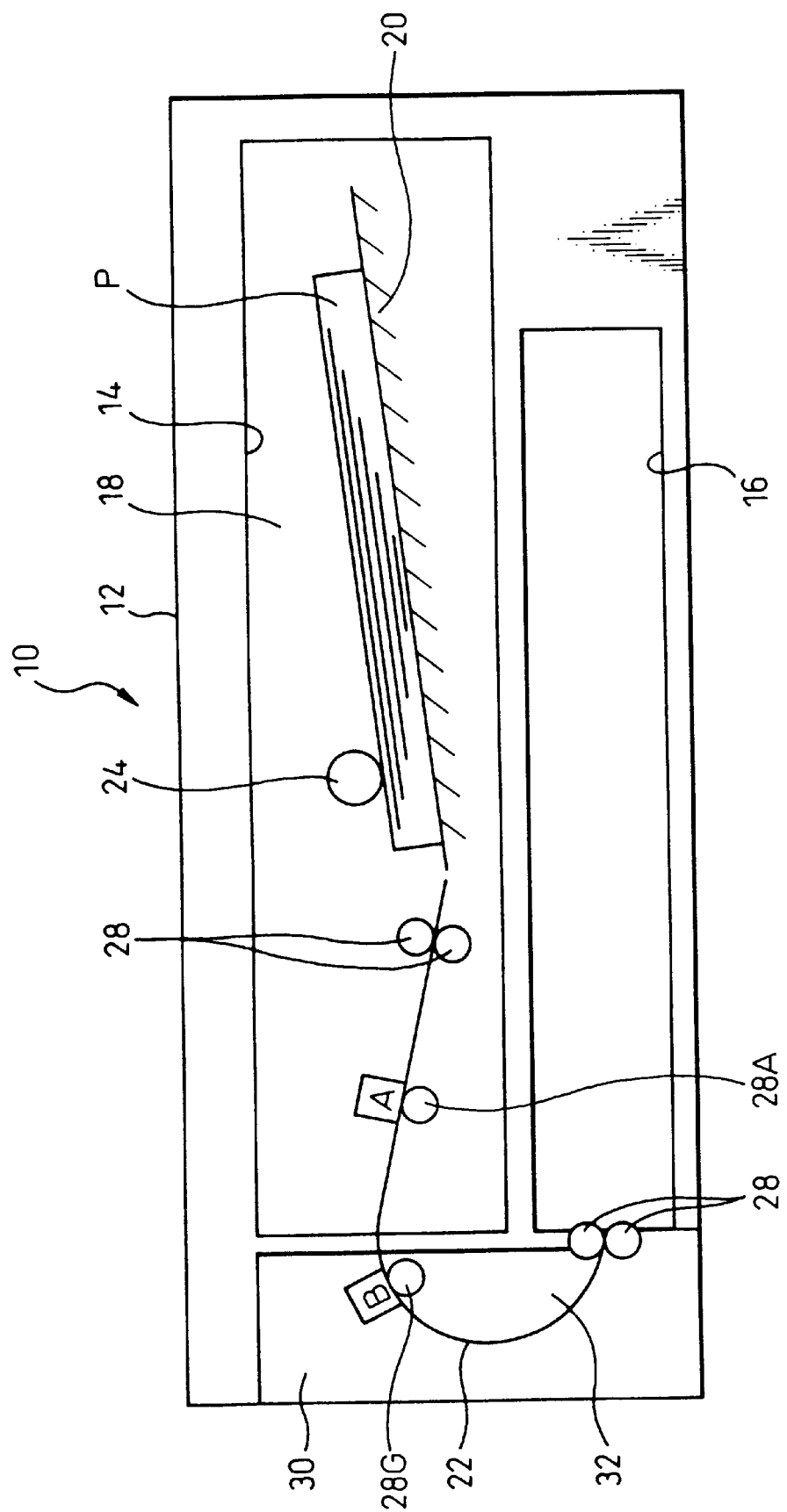

In FIG. 35, the upper image reading head "A" is arranged in the drawer 18, and the upper printing head "B" is arranged in the side cover 30 or an inner frame component in the casing 12. In this embodiment, the upper printing head "B" can be revealed, by opening the side cover 30, and it is possible to easily change an ink tank if the upper printing head "B" comprises an ink jet printing head.

Figure 36:
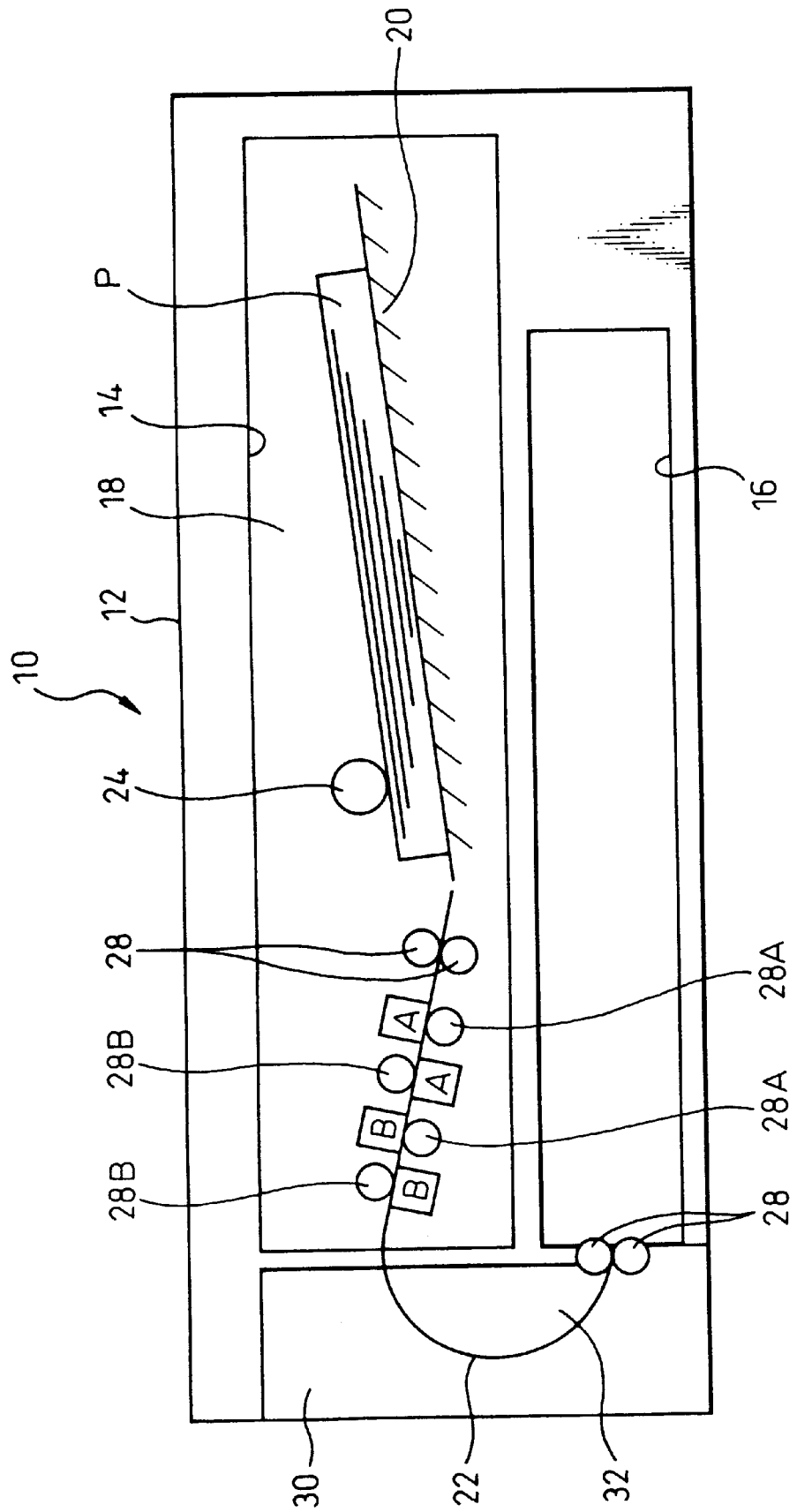

In FIG. 36, the upper image reading head "A", the lower image reading head "A", the upper printing head "B" and the lower printing head "A" are arranged in the drawer 18 in this order. It is necessary to arrange the upper printing head "B" after the upper and lower image reading heads "A" or to arrange the lower printing head "B" after either the upper image reading head "A" or the lower image reading head "A", in order to print a mark indicating that information or data was certainly read. Since four heads are arranged in the drawer 18, the drawer 18 will be become larger, but the maintenance of the heads is facilitated.

Figure 37:
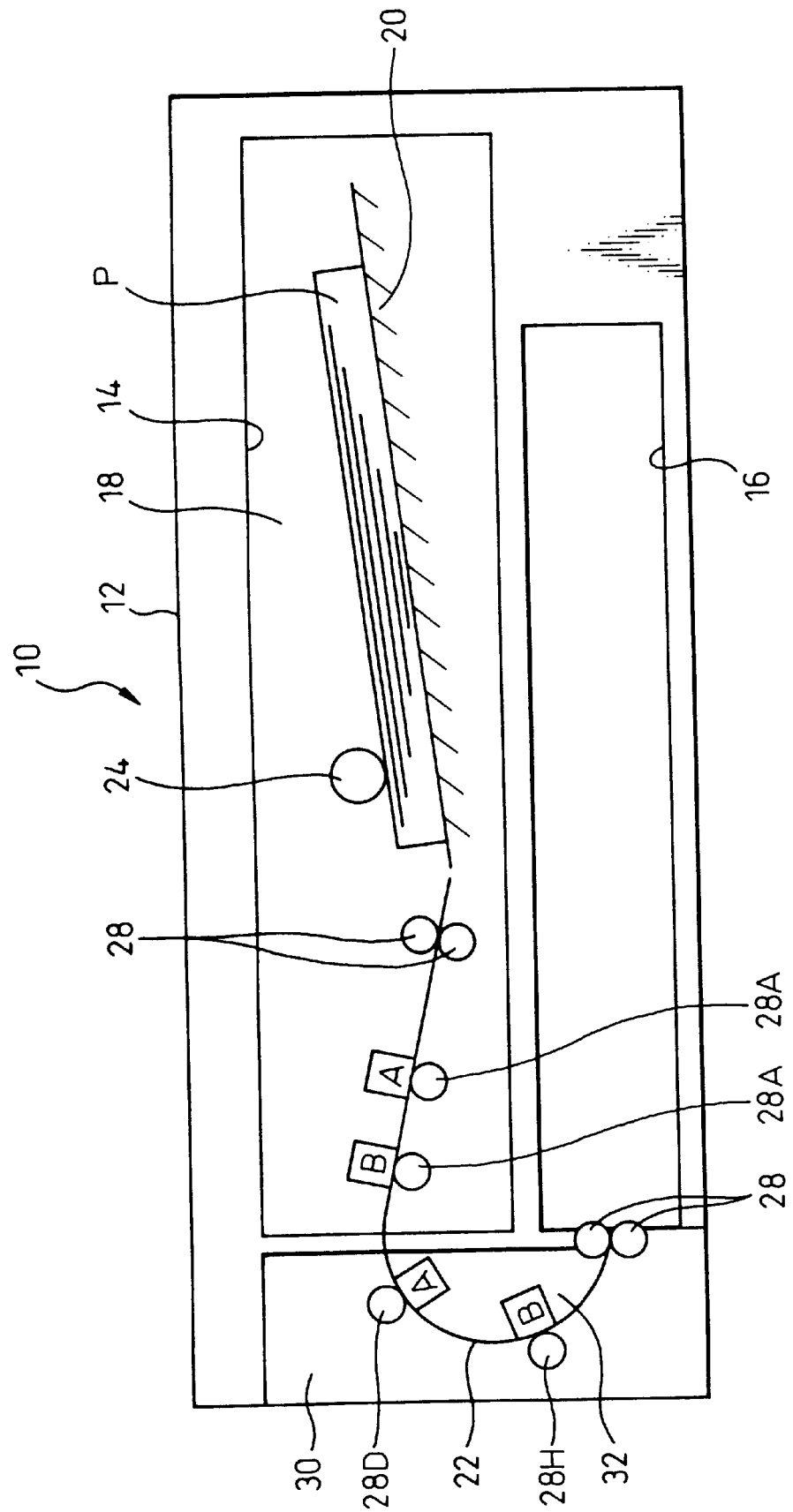

In FIG. 37, the upper image reading head "A" and the upper printing head "B" are arranged in the drawer 18, and the lower image reading head "A" and the lower printing head "B" are arranged in either the guide member 32 or an inner frame component in the casing 12. In this embodiment, it is possible to read and print information or data on both surfaces of the sheet. Since two heads are arranged in the drawer 18, the drawer 18 may be smaller than that of FIG. 36.

Figure 38:
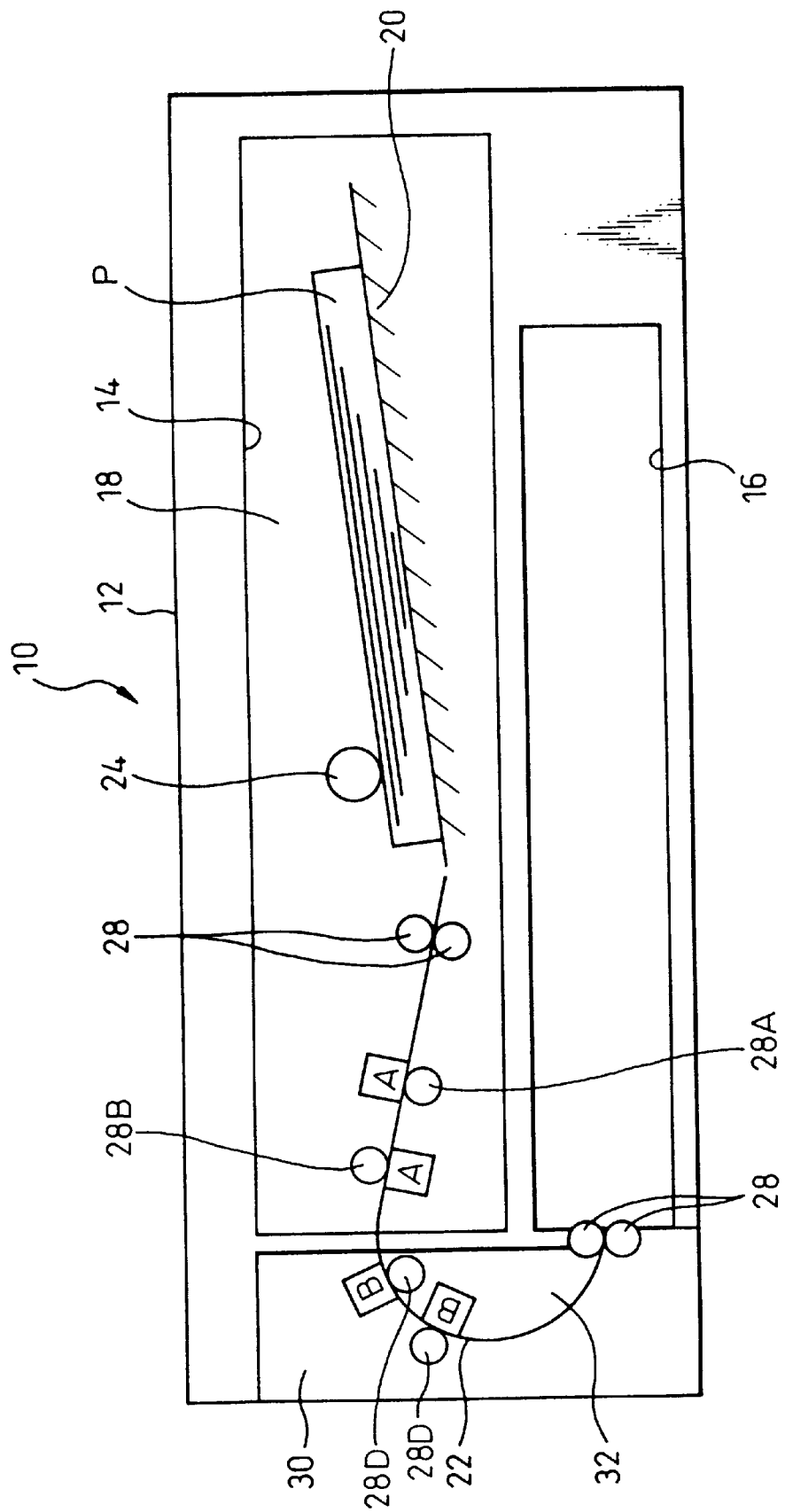

In FIG. 38, the upper image reading head "A" and the lower image reading head "A" are arranged in the drawer 18, and the upper printing head "B" and the lower printing head "B" are arranged in either the guide member 32 or an inner frame component in the casing 12.

Figure 39:
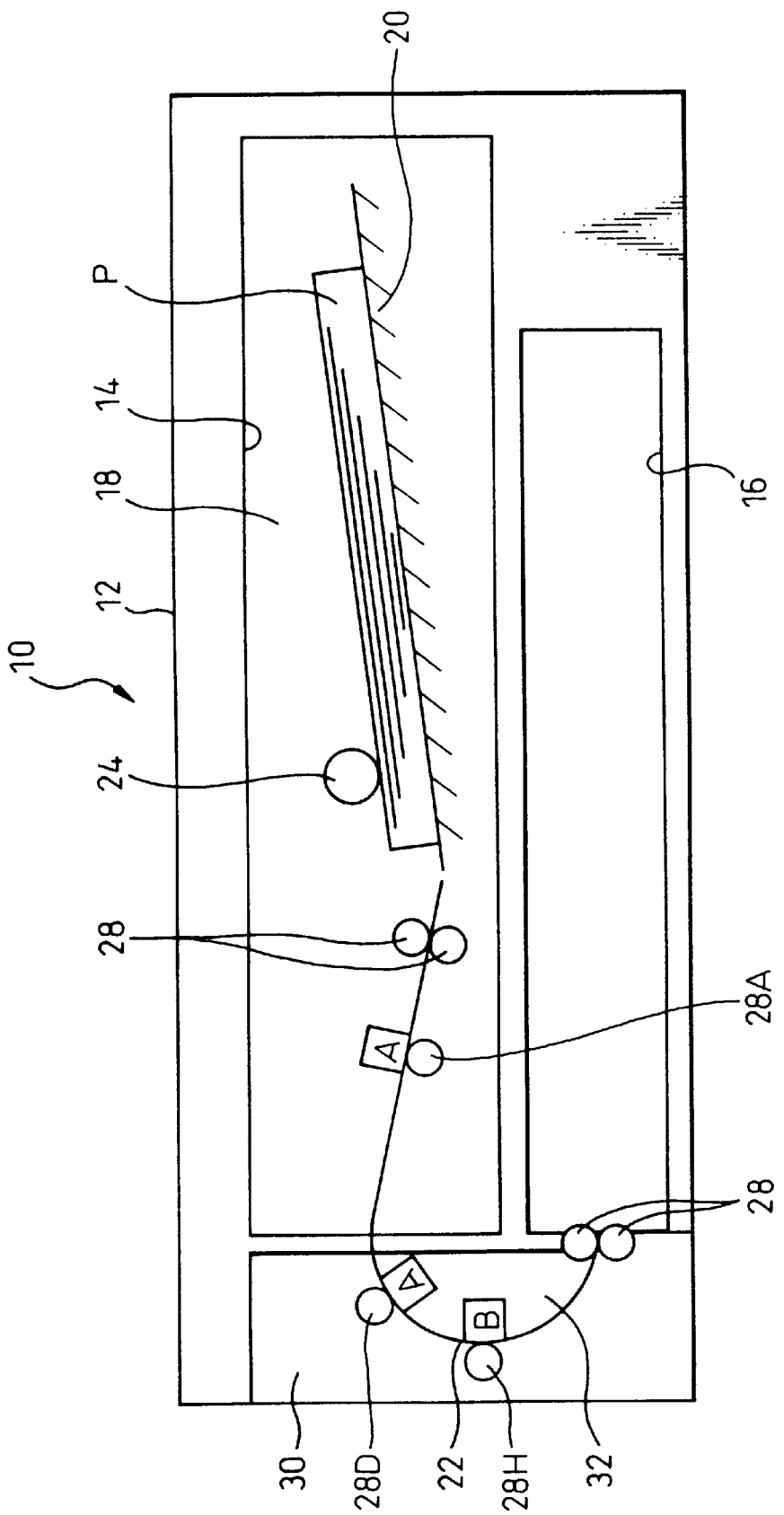

In FIG. 39, the upper image reading head "A" is arranged in the drawer 18, and the lower image reading head "A" and the lower printing head "B" are arranged in either the guide member 32 or an inner frame component in the casing 12.

Figure 40:
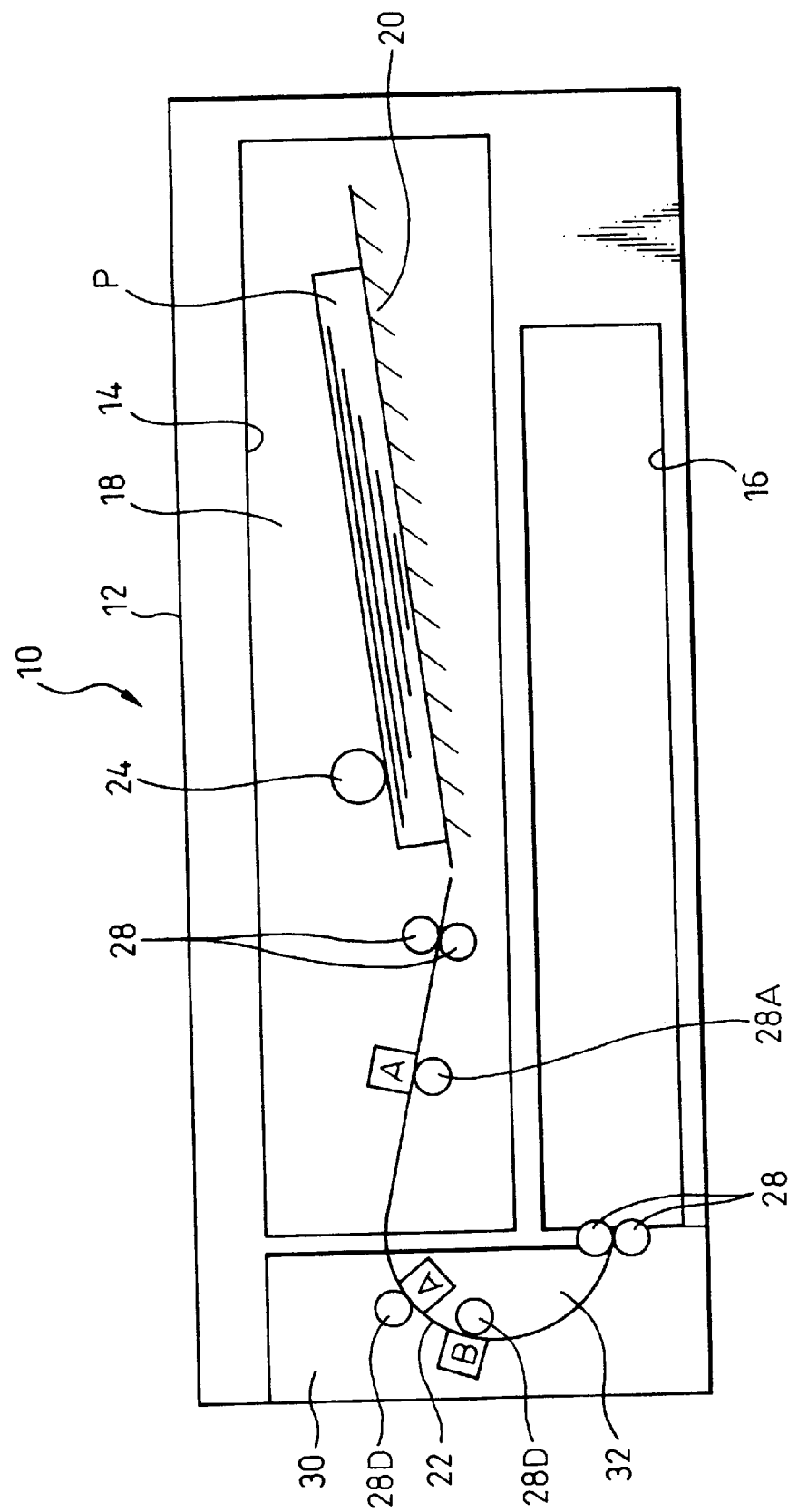

In FIG. 40, the upper image reading head "A" is arranged in the drawer 18, and the lower image reading head "A" and the upper printing head "B" are arranged in either the guide member 32 or an inner frame Component in the casing 12.

Figure 41:
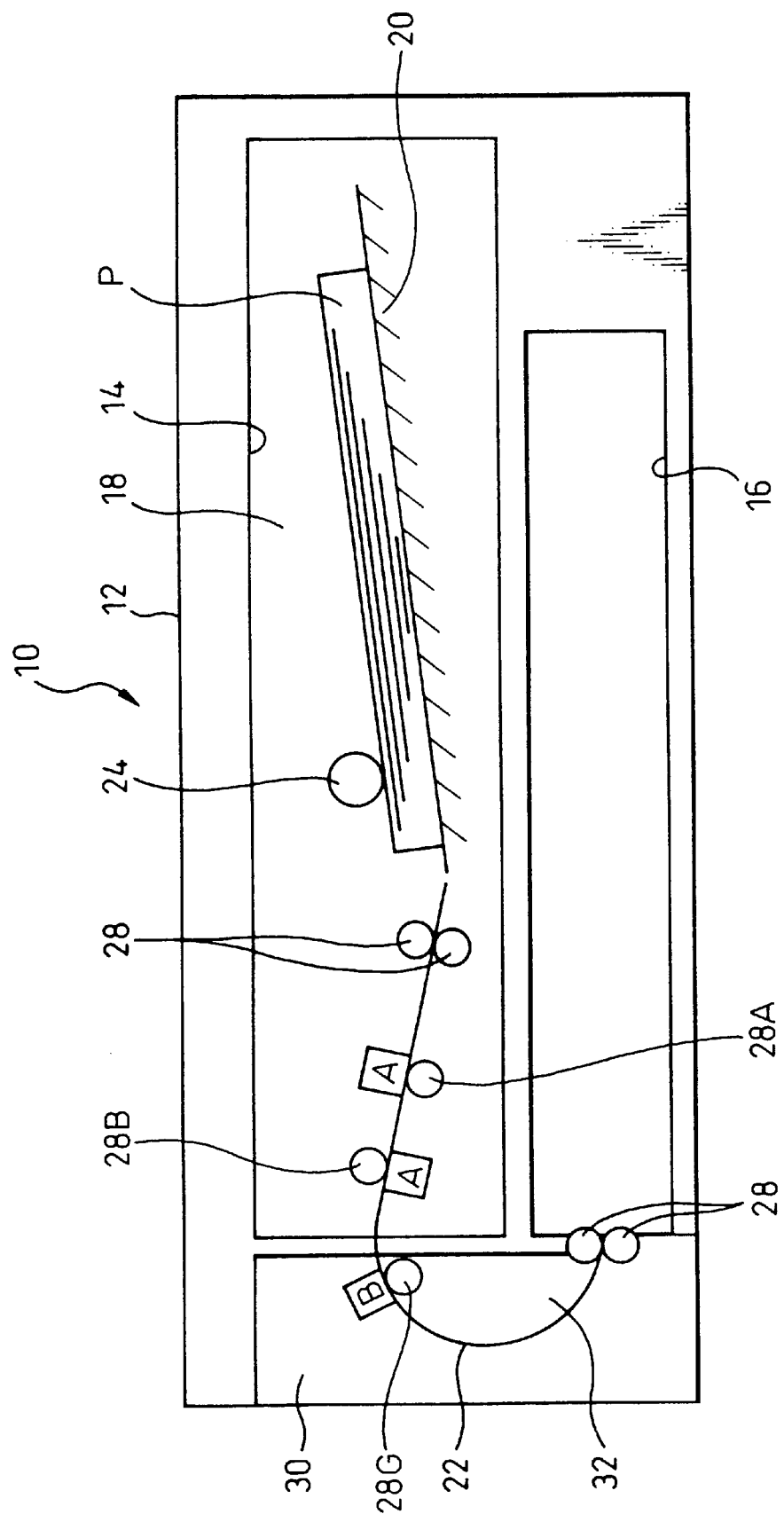

In FIG. 41, the upper image reading head "A" and the lower image reading head "A" are arranged in the drawer 18, and the upper printing head "B" is arranged in either the guide member 32 or an inner frame component in the casing 12.

Figure 42:
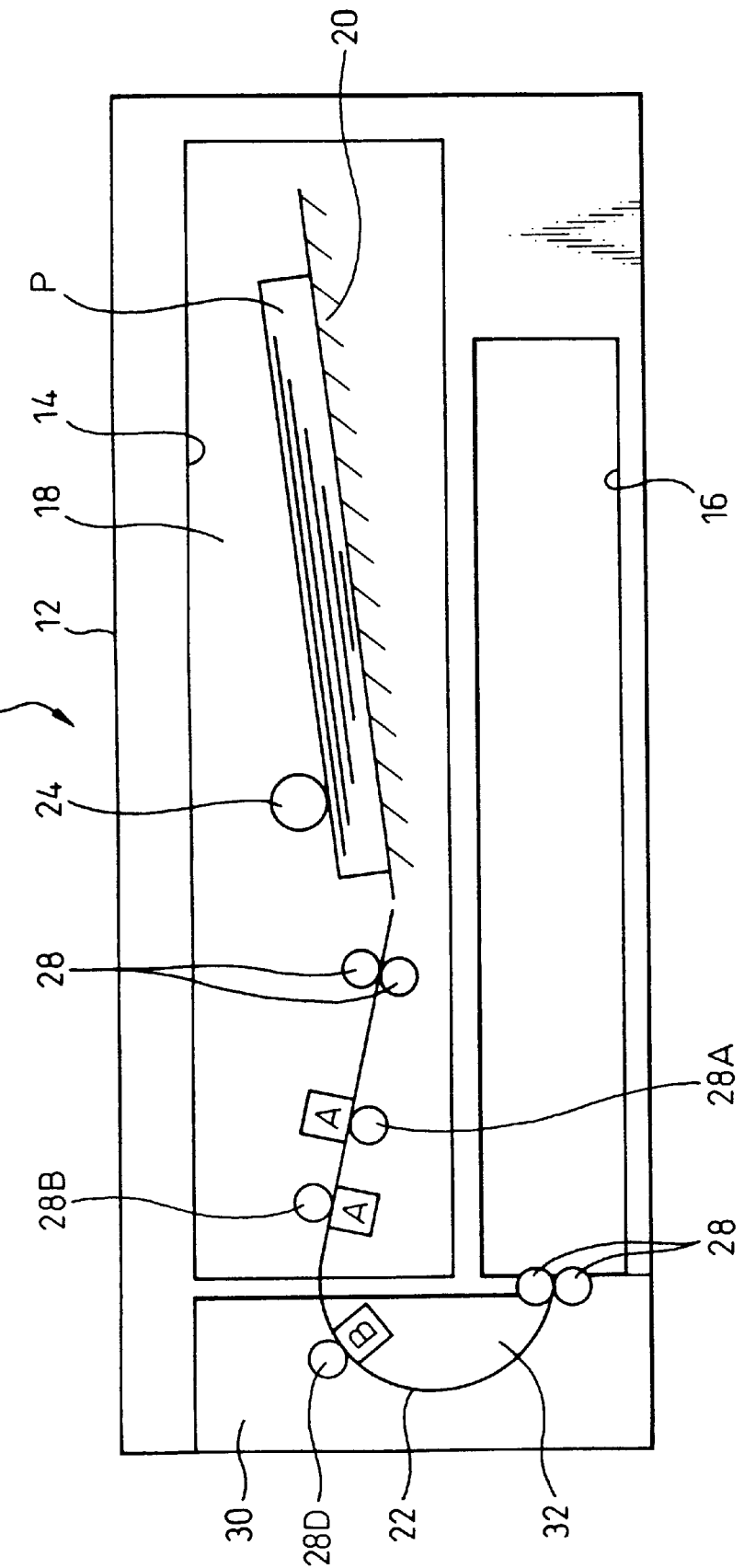

In FIG. 42, the upper image reading head "A" and the lower image reading head "A" are arranged in the drawer 18, and the lower printing head "B" is arranged in either the guide member 32 or an inner frame component in the casing 12.

Figure 43:
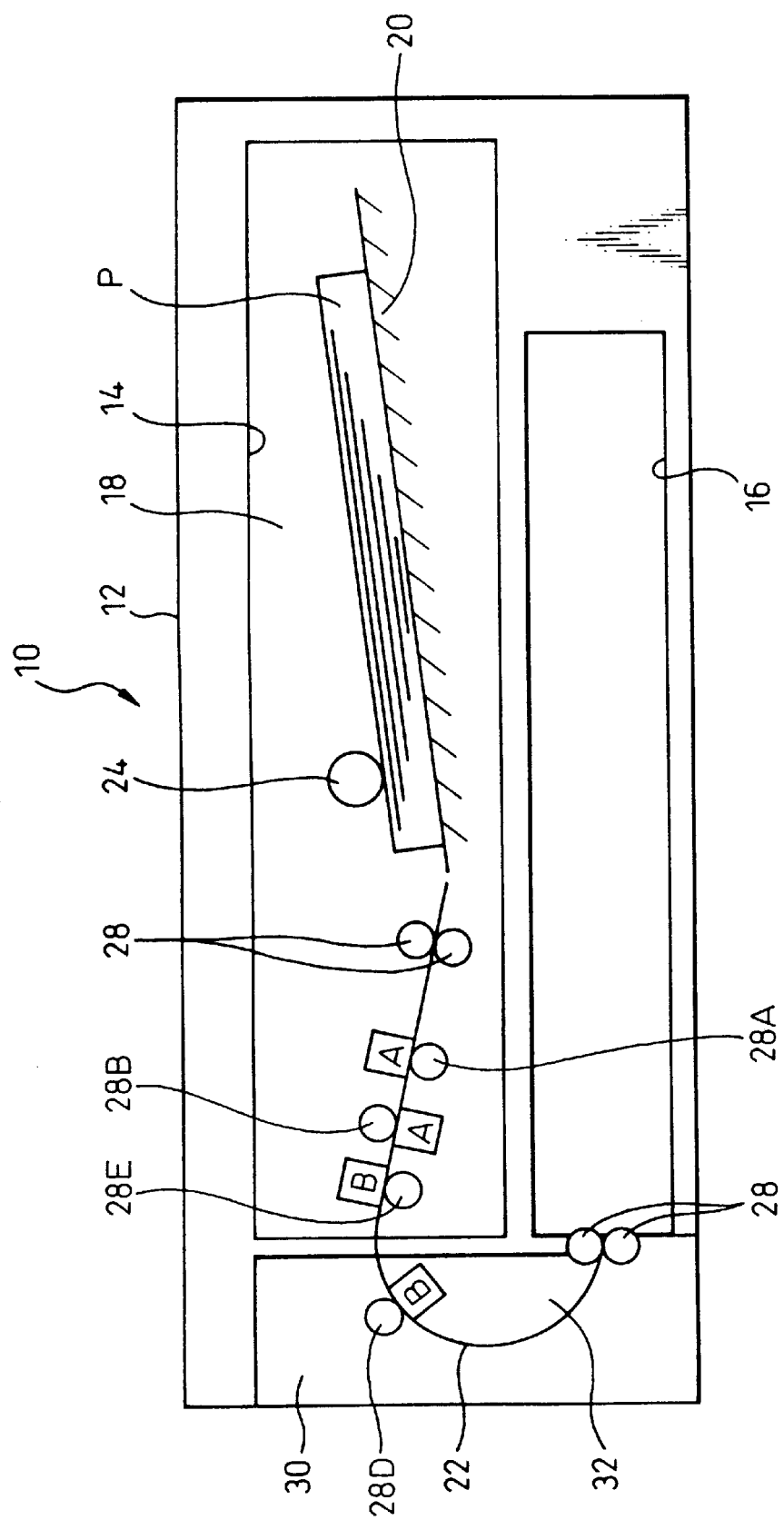

In FIG. 43, the upper image reading head "A", the lower image reading head "A" and the upper printing head "B" are arranged in the drawer 18, and the lower printing head "B" is arranged in either the guide member 32 or an inner frame component in the casing 12.

Figure 44:
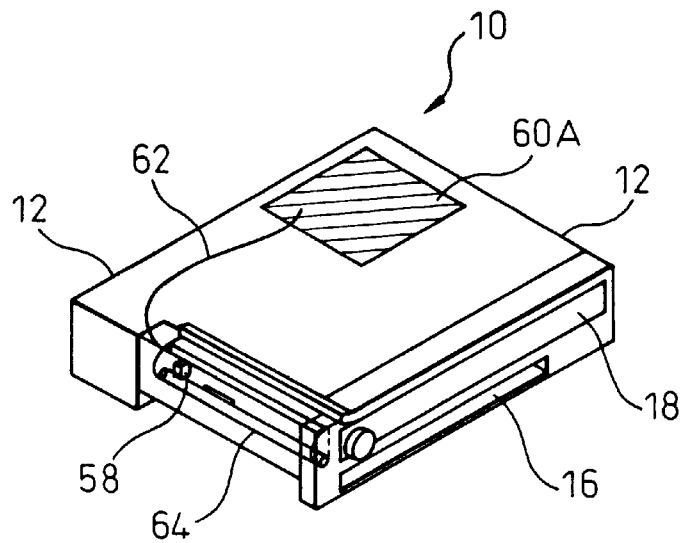
FIG. 44 is a perspective view of the casing having a replaceable printed wiring board.

FIG. 44 shows the casing 12 of the data processing apparatus 10 of FIGS. 11 and 12, but the dummy head 64 of FIG. 25 or 27 is attached to the casing 12. Therefore, the guide member 32 is removed from the casing 12, and only the upper data processing head 34 is used. The casing 12 has a printed wiring board 60A and a lead wire or cable 62 extending between the connector 58 and the printed wiring board 60A. This printed wiring board 60A is adapted for operating the upper data processing head 34.

Figure 45:
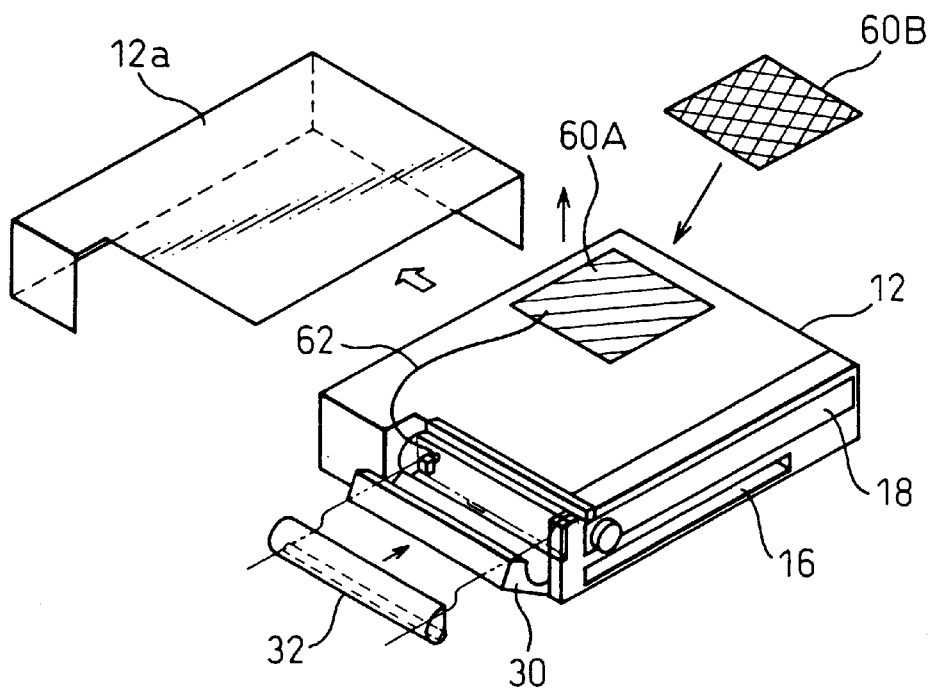
FIG. 45 is a perspective view of the casing of FIG. 44, illustrating the change of the printed wiring boards.

FIG. 45 shows the casing 12 of the data processing apparatus 10 of FIGS. 11 and 12, and the guide member 32 with the lower data processing head 36 is attached to the casing 12, so that the upper and lower data processing heads 34 and 36 are used. In this case, the printed wiring board 60A is replaced with a printed wiring board 60B which is adapted for operating both the upper and lower data processing heads 34 and 36. The printed wiring boards 60A and 60B are connected to the control unit (not shown).

Therefore, if a user wants the data processing capability on only one surface, the data processing apparatus 10 is provided with the upper data processing head 34, the dummy head 64 with no data processing head, and the printed wiring board 60A. If a user wants the data processing capability on both surfaces, the data processing apparatus 10 is provided with the upper data processing head 34, the guide member 32 with the lower data processing head 36, and the printed wiring board 60B. Therefore, it is possible to satisfy the demands of both above-described users, and a user who wants the data processing capability on one surface only can save the extra cost.

Figure 46:
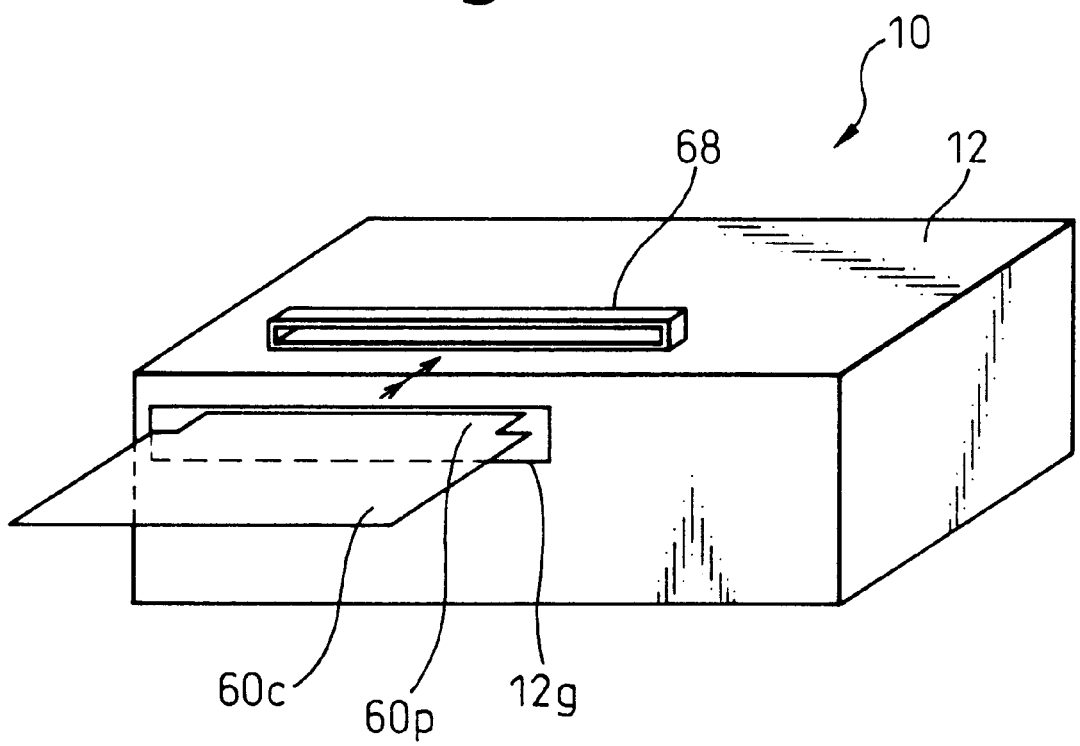
FIG. 46 is a perspective view of the casing having a slot to insert an additional printed wiring board.
Figure 47:
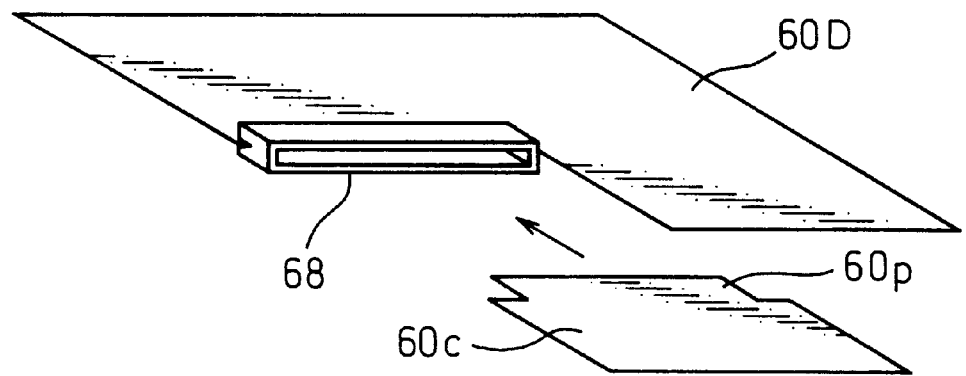
FIG. 47 is a perspective view of the printed wiring boards arranged in the casing of FIG. 46.

FIGS. 46 and 47 show a further example of printed wiring boards. In this case, the casing 12 of the data processing apparatus 10 has a slot 12g on the rear side of the casing 12 for inserting a printed wiring board 60C. A connector 68 is provided in the casing 12. A printed wiring board 60D of FIG. 47 is arranged in the casing 12, the printed wiring board 60D having the connector 68. The printed wiring board 60C has a connector 60p, and the printed wiring board 60C is fitted in the connector 68 of the printed wiring board 60D when the printed wiring board 60C is inserted in the slot 12g of the casing. The printed wiring board 60D is adapted for operating the upper data processing head 34 when the dummy head 64 is used. The printed wiring board 60C is adapted for operating the lower data processing head 36 when the guide member 32 with the lower data processing head 36 is used. Thus, in the latter case, the printed wiring board 60D and the printed wiring board 60C can operate the upper and lower data processing heads 34 and 36. It is not necessary to open the cover 12a of FIG. 45.

Figure 48:
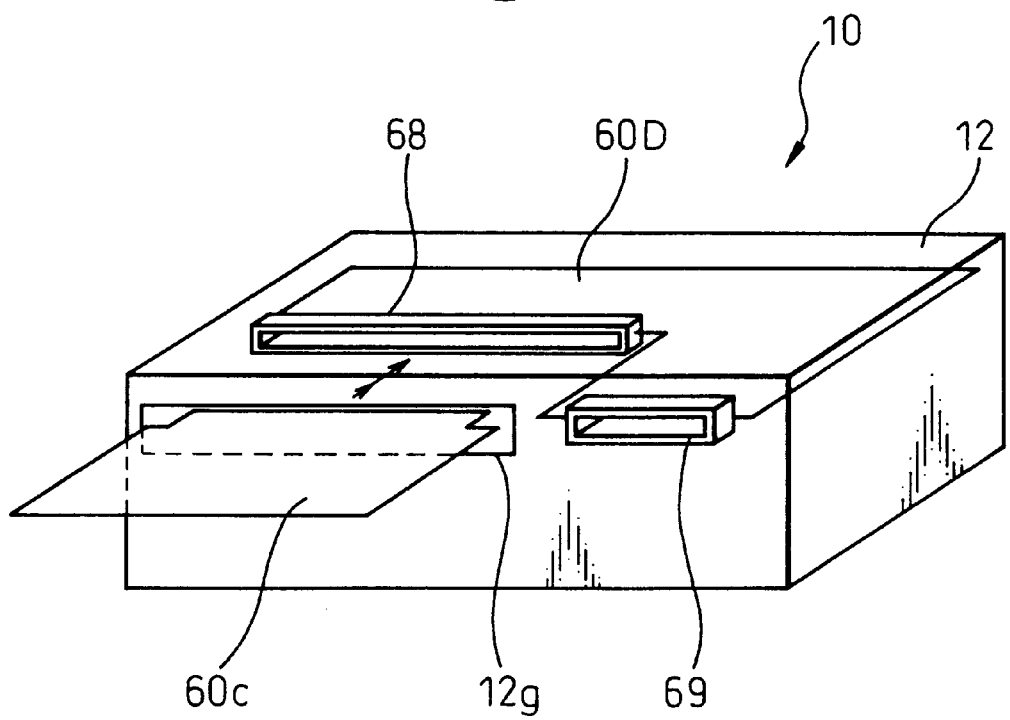
FIG. 48 is a perspective view of the modified casing having slots.

FIG. 48 shows a modification of the casing 12 of FIG. 46. In this case, the casing 12 of the data processing apparatus 10 has an additional connector 69 which is connected to either the connector 68 or to the control unit. The additional connector 69 is connected to an external device.

Figure 49:
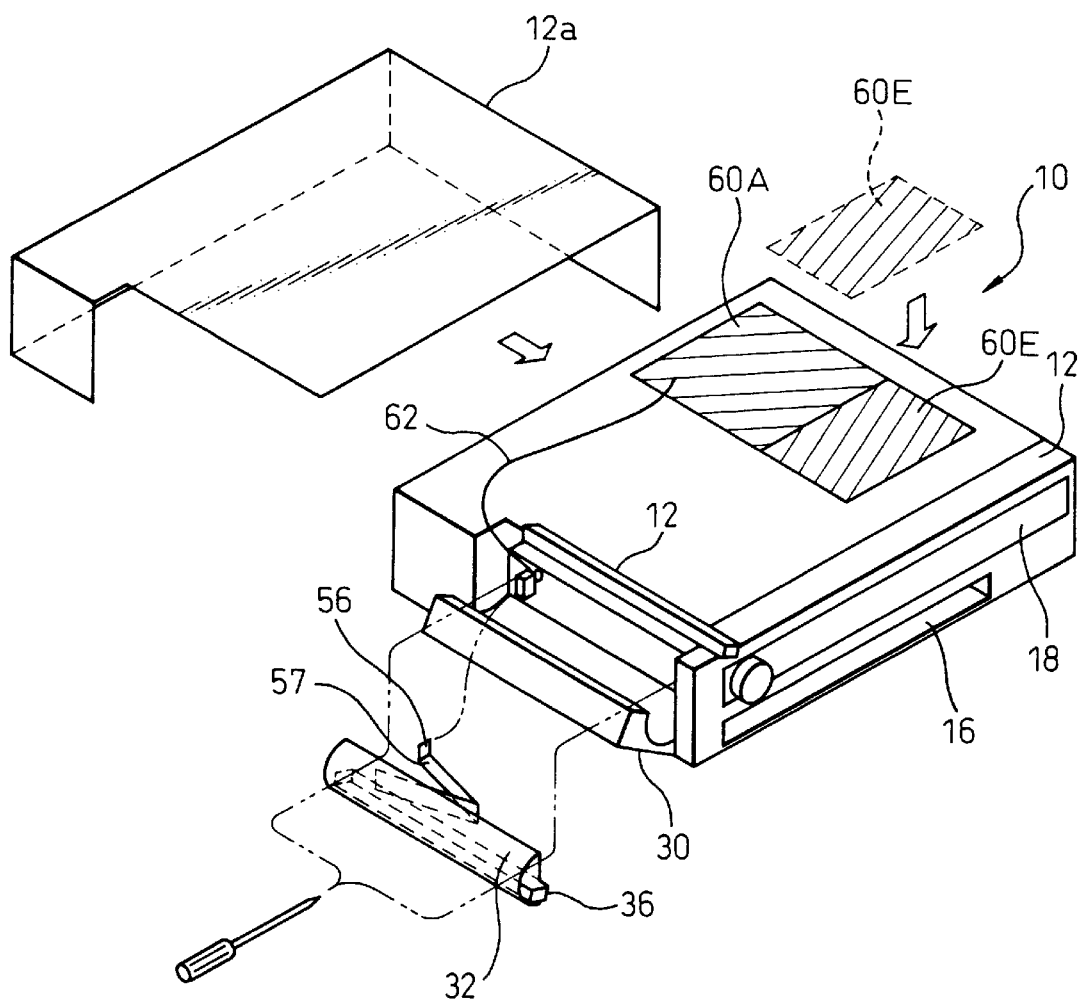
FIG. 49 is a perspective view of the casing having the initial and additional printed wiring boards.
Figure 50:
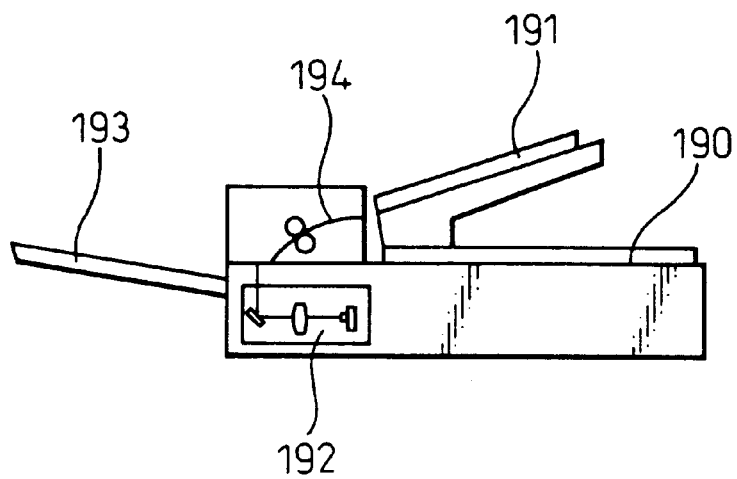
FIG. 50 is a view a prior art apparatus.
Figure 51:
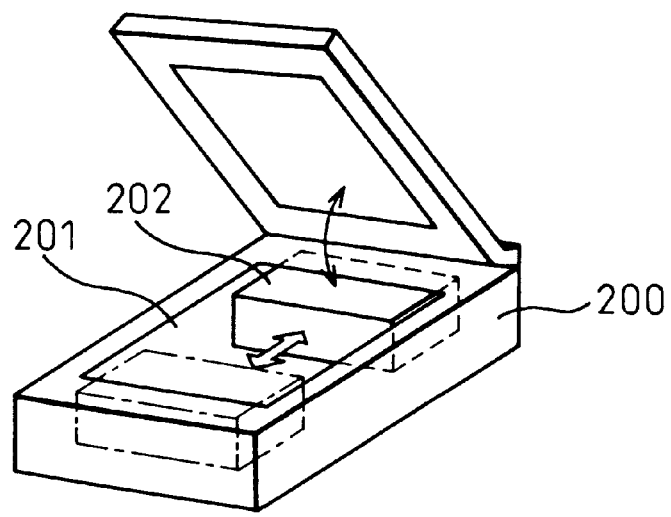
FIG. 51 is a view of another prior art apparatus.
Figure 52:
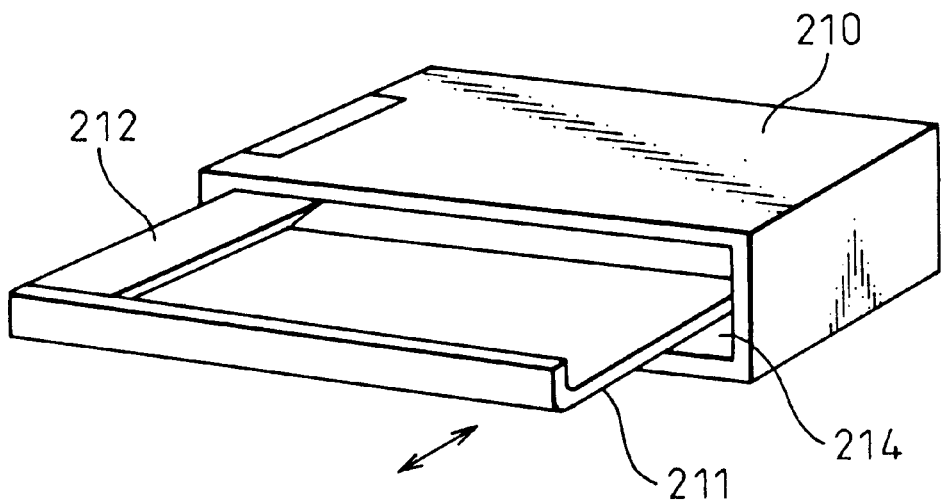
FIG. 52 is a perspective view of the data processing apparatus to which the present invention is based.
Figure 53:
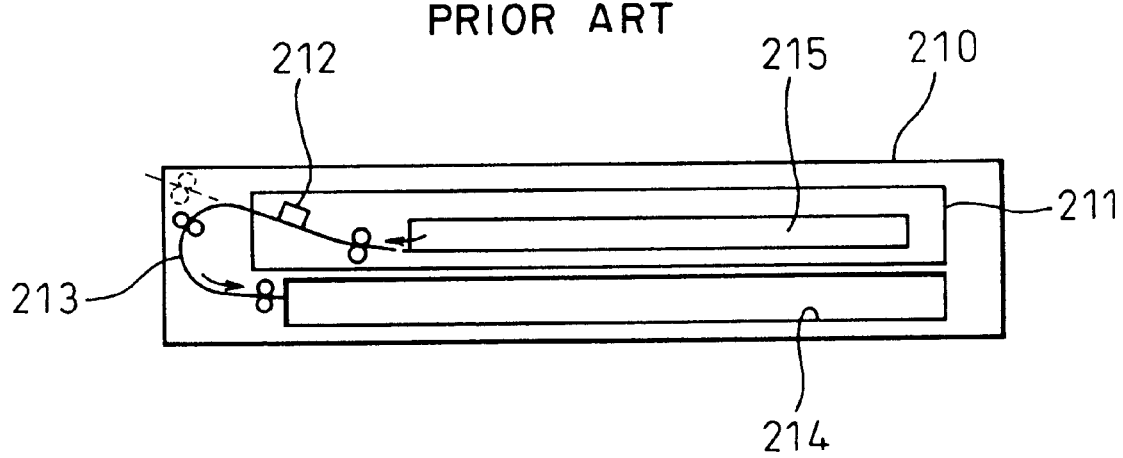
FIG. 53 is a cross-sectional view of the apparatus of FIG. 52.

FIG. 49 shows a further example of printed wiring boards. In this case, the casing 12 of the data processing apparatus 10 has a printed wiring board 60A adapted for operating the upper data processing head 34 when the dummy head 64 is used. The casing 12 also has an area at which a printed wiring board 60E is selectively arranged. The printed wiring board 60E is adapted for operating the lower data processing head 36 when the guide member 32 with the lower data processing head 36 is used. Thus, the printed wiring board 60A and the printed wiring board 60E can operate the upper and lower data processing heads 34 and 36.

I claim:

1. A data processing apparatus comprising:

a casing having a first cavity and a second cavity arranged in a vertically spaced relationship;

a drawer arranged in one of said first and second cavities, said drawer being movable between a pulled-out position and a pushed-in position and having a hopper for accommodating sheets stacked thereon, each of said sheets having a first surface and a second surface;

sheet conveying means for conveying sheets along a sheet conveying path formed in said apparatus, wherein said sheet conveying path extends from said hopper when said drawer is in said pushed-in position, to another of said first and second cavities in which said drawer is arranged;

first data processing means, arranged in said drawer, for acting on said first surface of said sheet;

second data processing means, arranged in said drawer, for acting on said second surface of said sheet; and wherein both said first data processing means and said second data processing means are arranged in said drawer in such a manner so that both said first data processing means and said second data processing means are operable both when said drawer is in said pushed-in position and when said drawer is in said pulled-out position.

2. The data processing apparatus according to claim 1, wherein at least one of said first and second data processing means comprises an image reading head for reading data on said sheet.

3. The data processing apparatus according to claim 1, wherein at least one of said first and second data processing means comprises a printing head for printing data onto said sheet.

4. The data processing apparatus according to claim 1, wherein said first cavity is arranged above said second cavity.

5. The data processing apparatus according to claim 1, wherein said second data processing means is detachably arranged in said drawer.

6. A data processing apparatus comprising:

a casing having first and second cavities arranged in spaced vertical relationship;

a drawer arranged in any one of said first and second cavities, said drawer being movable between a pulled-out position and a pushed-in position and having a hopper for accommodating sheets stacked thereon, each of said sheets having a first surface and a second surface;

sheet conveying means for conveying sheets along a sheet conveying path formed in said apparatus, said sheet conveying path extending from said hopper when said drawer is in said pushed-in position, to another of said first and second cavities in which said drawer is arranged, wherein said sheet conveying path includes a curved portion between said first and second cavities;

first data processing means, arranged in said drawer, for acting on said first surface of said sheet; and second data processing means for acting on said second surface of said sheet, wherein said second data processing means is arranged in said casing at a position along said curved portion of said sheet conveying path;

wherein said second data processing means is incorporated in a guide member, said guide member being positioned inside a cover and said guide member having a concave surface;

wherein said curved portion of said sheet conveying path comprises said cover, said cover being attached to said apparatus and said cover having a concave surface; and wherein said guide member having said second data processing means incorporated therein is detachably attached to said casing of said data processing apparatus, and wherein a further guide member having no data processing means and having an outer profile generally identical to that of said first guide member can be attached to said casing of said data processing apparatus when said first guide member is detached from said casing of said data processing apparatus.

7. A data processing apparatus comprising:

a casino having a first cavity and a second cavity arranged in a vertically spaced relationship;

a drawer arranged in any one of said first and second cavities, said drawer being movable between a pulled-out position and a pushed-in position and having a hopper for accommodating sheets stacked thereon, each of said sheets having a first surface and a second surface;

sheet conveying means for conveying sheets along a sheet conveying path formed in said apparatus, wherein said sheet conveying path extends from said hopper when said drawer is in said pushed-in position, to another of said first and second cavities in which said drawer is arranged;

first data processing means, arranged in said drawer, for acting on said first surface of said sheet;

second data processing means, arranged in said drawer, for acting on said second surface of said sheet;

wherein both said first data processing means and said second data processing means are arranged in said drawer in such a manner so that both said first data processing means and said second data processing means are operable both when said drawer is in said pushed-in position and when said drawer is in said pulled-out position; and wherein said second data processing means is detachably arranged in said apparatus, and further comprising a first printed wiring board adapted for operating said first data processing means when said first data processing means only is used in said apparatus, and a second printed wiring board adapted for operating said second data processing means, said first printed wiring board having a first connector, said second printed wiring board having a second connector coupled to said first connector when said second data processing means is used in said apparatus and said second printed wiring board is inserted in said apparatus.

8. A data processing apparatus comprising:

a casing having a first cavity and a second cavity arranged in a vertically spaced relationship;

a drawer arranged in any one of said first and second cavities, said drawer being movable between a pulled-out position and a pushed-in position and having a hopper for accommodating sheets stacked thereon, each of said sheets having a first surface and a second surface;

sheet conveying means for conveying sheets along a sheet conveying path formed in said apparatus, wherein said sheet conveying path extends from said lopper when said drawer is in said pushed-in position to another of said first and second cavities in which said drawer is arranged;

first data processing means, arranged in said drawer, for acting on said first surface of said sheet;

second data processing means, arranged in said drawer, for acting on said second surface of said sheet;

wherein both said first data processing means and said second data processing means are arranged in said drawer in such a manner so that both said first data processing means and said second data processing means are operable both when said drawer is in said pushed-in position and when said drawer is in said pulled-out position; and wherein said second data processing means is detachably arranged in said apparatus, and further comprising a first printed wiring board adapted for operating said first data processing means when said first data processing means only is used in said apparatus, and a second printed wiring board adapted for operating said first data processing means and said second data processing means, said second printed wiring board being replaceable with said first printed wiring board when said second data processing means is used with said first data processing means in said apparatus.

9. A data processing apparatus comprising:

a casing having a first cavity and a second cavity arranged in a vertically spaced relationship;

a drawer arranged in one of said first and second cavities, said drawer being movable between a pulled-out position and a pushed-in position and having a hopper for accommodating sheets stacked thereon, each of said sheets having a first surface and a second surface;

sheet conveying means for conveying sheets in said apparatus along a sheet conveying path from said hopper when said drawer is in said pushed-in position with respect to another of said first cavity and said second cavity in which said drawer is arranged, said sheet conveying path including a curved portion between said first and second cavities;

said curved portion of said sheet conveying path comprising a cover attached to said data processing apparatus and having a concave surface, and guide means positioned inside of said cover and having a convex surface;

first data processing means arranged in said drawer for acting on said first surface of said sheet; and second data processing means arranged in said data processing apparatus for acting on said second surface of said sheet;

said guide means comprising one of a first guide member having said second data processing means incorporated therein, an outer profile, and attaching means, and a second guide member having no data processing means, an outer profile generally identical to said outer profile of said first guide member, and attaching means formed identically to said attaching means of said first guide member;

attaching means coupled for engagement with said attaching means of one of said first and second guide members to selectively attach one of said first and second guide members to said data processing apparatus; and electrical connecting means, provided in said casing, for connection to said second data processing means, even when said second guide member is coupled to said apparatus.

10. The data processing apparatus according to claim 9, wherein said second guide member has auxiliary guide means at a position corresponding to a position of said second data processing means in said first guide member.

11. The data processing apparatus according to claim 10, wherein said auxiliary guide means comprises a roller.

12. The data processing apparatus according to claim 11, wherein said auxiliary guide means comprises a plate which is elastically forced towards said roller of said sheet conveying means.

* * * * *